US008185921B2

(12) United States Patent
Candelore

(10) Patent No.: US 8,185,921 B2
(45) Date of Patent: May 22, 2012

(54) PARENTAL CONTROL OF DISPLAYED CONTENT USING CLOSED CAPTIONING

(75) Inventor: Brant L. Candelore, San Digeo, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 964 days.

(21) Appl. No.: 11/363,716

(22) Filed: Feb. 28, 2006

(65) Prior Publication Data

US 2007/0204288 A1    Aug. 30, 2007

(51) Int. Cl.
*H04N 7/16* (2011.01)
*H04N 7/10* (2006.01)
*H04N 7/025* (2006.01)
*H04N 7/173* (2011.01)
*H04N 7/12* (2006.01)
*H04N 11/02* (2006.01)
*H04N 11/04* (2006.01)
*H04N 11/00* (2006.01)
*H04N 7/00* (2011.01)
*H04N 5/92* (2006.01)
*H04H 60/32* (2008.01)

(52) U.S. Cl. ............... 725/20; 725/14; 725/17; 725/25; 725/28; 725/32; 725/34; 725/35; 725/131; 725/132; 725/133; 725/139; 725/151; 348/435.1; 348/468; 348/478; 386/245; 386/261

(58) Field of Classification Search .............. 725/14, 725/25, 28, 32, 34, 35, 135, 136, 137; 348/589
See application file for complete search history.

(56) References Cited

U.S. PATENT DOCUMENTS

| 3,852,519 | A | 12/1974 | Court |
| 4,381,519 | A | 4/1983 | Wilkinson et al. |
| 4,419,693 | A | 12/1983 | Wilkinson |
| 4,521,853 | A | 6/1985 | Guttag |
| 4,634,808 | A | 1/1987 | Moerder |
| 4,700,387 | A | 10/1987 | Hirata |
| 4,703,351 | A | 10/1987 | Kondo |
| 4,703,352 | A | 10/1987 | Kondo |
| 4,710,811 | A | 12/1987 | Kondo |
| 4,712,238 | A | 12/1987 | Gilhousen et al. |
| 4,722,003 | A | 1/1988 | Kondo |

(Continued)

FOREIGN PATENT DOCUMENTS

EP    0471373    2/1992

(Continued)

OTHER PUBLICATIONS

Media Ratings and Proposals.pdf, Joel Federman, Ph.D., ("Rating Sex and Violence in the Media: Media Ratings and Proposals for Reform", A Kaiser Family Foundation Report, Nov. 2002), http://www.kff.org/entmedia/index.cfm.*

(Continued)

*Primary Examiner* — Joseph P Hirl
*Assistant Examiner* — Mary A Kay
(74) *Attorney, Agent, or Firm* — Blakely, Sokoloff, Taylor & Zafman LLP

(57) ABSTRACT

According to one embodiment, a method for blocking scenes with objectionable content comprises receiving incoming content, namely a scene of a program. Thereafter, using closed captioning information, a determination is made if the scene of the program includes objectionable content, and if so, blocking the scene from being displayed.

26 Claims, 9 Drawing Sheets

U.S. PATENT DOCUMENTS

| | | |
|---|---|---|
| 4,739,510 A | 4/1988 | Jeffers et al. |
| 4,772,947 A | 9/1988 | Kono |
| 4,785,361 A | 11/1988 | Brotby |
| 4,788,589 A | 11/1988 | Kondo |
| 4,815,078 A | 3/1989 | Shimura |
| 4,845,560 A | 7/1989 | Kondo et al. |
| 4,881,263 A | 11/1989 | Herbison et al. |
| 4,887,296 A | 12/1989 | Horne |
| 4,890,161 A | 12/1989 | Kondo |
| 4,914,515 A | 4/1990 | Van Luyt |
| 4,924,310 A | 5/1990 | von Brandt |
| 4,944,006 A | 7/1990 | Citta et al. |
| 4,953,023 A | 8/1990 | Kondo |
| 4,964,126 A | 10/1990 | Musicus et al. |
| 4,989,245 A | 1/1991 | Bennett |
| 4,995,080 A | 2/1991 | Bestler et al. |
| 5,018,197 A | 5/1991 | Jones et al. |
| 5,023,710 A | 6/1991 | Kondo et al. |
| 5,091,936 A | 2/1992 | Katznelson et al. |
| 5,122,873 A | 6/1992 | Golin |
| 5,138,659 A | 8/1992 | Kelkar et al. |
| 5,142,537 A | 8/1992 | Kutner et al. |
| 5,144,662 A | 9/1992 | Welmer |
| 5,144,664 A | 9/1992 | Esserman et al. |
| 5,151,782 A | 9/1992 | Ferraro |
| 5,159,452 A | 10/1992 | Kinoshita et al. |
| 5,195,135 A | 3/1993 | Palmer |
| 5,196,931 A | 3/1993 | Kondo |
| 5,208,816 A | 5/1993 | Seshardi et al. |
| 5,237,424 A | 8/1993 | Nishino et al. |
| 5,237,610 A | 8/1993 | Gammie et al. |
| 5,241,381 A | 8/1993 | Kondo |
| 5,247,575 A | 9/1993 | Sprague et al. |
| 5,258,835 A | 11/1993 | Kato |
| 5,319,707 A | 6/1994 | Wasilewski et al. |
| 5,319,712 A | 6/1994 | Finkelstein et al. |
| 5,325,432 A | 6/1994 | Gardeck et al. |
| 5,327,502 A | 7/1994 | Katata |
| 5,341,425 A | 8/1994 | Wasilewski et al. |
| 5,359,694 A | 10/1994 | Concordel |
| 5,379,072 A | 1/1995 | Kondo |
| 5,381,481 A | 1/1995 | Gammie et al. |
| 5,398,078 A | 3/1995 | Masuda et al. |
| 5,400,401 A | 3/1995 | Wasilewski et al. |
| 5,414,852 A | 5/1995 | Kramer et al. |
| 5,416,651 A | 5/1995 | Uetake et al. |
| 5,416,847 A | 5/1995 | Boze |
| 5,420,866 A | 5/1995 | Wasilewski et al. |
| 5,428,403 A | 6/1995 | Andrew et al. |
| 5,434,716 A | 7/1995 | Sugiyama et al. |
| 5,438,369 A | 8/1995 | Citta et al. |
| 5,444,491 A | 8/1995 | Lim |
| 5,444,782 A | 8/1995 | Adams et al. |
| 5,455,862 A | 10/1995 | Hoskinson |
| 5,463,565 A | 10/1995 | Cookson et al. |
| 5,469,216 A | 11/1995 | Takahashi et al. |
| 5,471,501 A | 11/1995 | Parr et al. |
| 5,473,692 A | 12/1995 | Davis |
| 5,477,263 A | 12/1995 | O'Callaghan et al. |
| 5,481,296 A * | 1/1996 | Cragun et al. ............... 725/136 |
| 5,481,554 A | 1/1996 | Kondo |
| 5,481,627 A | 1/1996 | Kim |
| 5,485,577 A | 1/1996 | Eyer et al. |
| 5,491,748 A | 2/1996 | Auld, Jr. et al. |
| 5,515,107 A | 5/1996 | Chiang et al. |
| 5,526,427 A | 6/1996 | Thomas et al. |
| 5,528,608 A | 6/1996 | Shimizume |
| 5,535,276 A | 7/1996 | Ganesan |
| 5,539,823 A | 7/1996 | Martin et al. |
| 5,539,828 A | 7/1996 | Davis |
| 5,553,141 A | 9/1996 | Lowry et al. |
| 5,555,305 A | 9/1996 | Robinson et al. |
| 5,561,457 A | 10/1996 | Cragun et al. |
| 5,561,713 A | 10/1996 | Suh |
| 5,568,552 A | 10/1996 | Davis |
| 5,574,787 A | 11/1996 | Ryan |
| 5,582,470 A | 12/1996 | Yu |
| 5,583,576 A | 12/1996 | Perlman et al. |
| 5,583,863 A | 12/1996 | Darr, Jr. et al. |
| 5,590,202 A | 12/1996 | Bestler et al. |
| 5,594,507 A | 1/1997 | Hoarty |
| 5,598,214 A | 1/1997 | Kondo et al. |
| 5,600,378 A | 2/1997 | Wasilewski |
| 5,600,721 A | 2/1997 | Kitazato |
| 5,606,359 A | 2/1997 | Youden et al. |
| 5,608,448 A | 3/1997 | Smoral et al. |
| 5,615,265 A | 3/1997 | Coutrot |
| 5,617,333 A | 4/1997 | Oyamada et al. |
| 5,625,715 A | 4/1997 | Trew et al. |
| 5,629,866 A | 5/1997 | Carrubba et al. |
| 5,629,981 A | 5/1997 | Nerlikar |
| 5,644,507 A | 7/1997 | Ostrover et al. |
| 5,652,615 A | 7/1997 | Bryant et al. |
| 5,652,795 A | 7/1997 | Eillon et al. |
| 5,663,764 A | 9/1997 | Kondo et al. |
| 5,666,293 A | 9/1997 | Metz et al. |
| 5,696,906 A | 12/1997 | Peters et al. |
| 5,699,429 A | 12/1997 | Tamer et al. |
| 5,703,655 A | 12/1997 | Corey et al. |
| 5,703,889 A | 12/1997 | Shimoda et al. |
| 5,717,814 A | 2/1998 | Abecassis |
| 5,726,702 A | 3/1998 | Hamaguchi et al. |
| 5,726,711 A | 3/1998 | Boyce |
| 5,732,346 A | 3/1998 | Lazaridis et al. |
| 5,742,680 A | 4/1998 | Wilson |
| 5,742,681 A | 4/1998 | Giachetti et al. |
| 5,751,280 A | 5/1998 | Abbott et al. |
| 5,751,743 A | 5/1998 | Takizawa |
| 5,751,813 A | 5/1998 | Dorenbos |
| 5,754,650 A | 5/1998 | Katznelson |
| 5,754,658 A | 5/1998 | Aucsmith et al. |
| 5,757,417 A | 5/1998 | Aras et al. |
| 5,757,909 A | 5/1998 | Park |
| 5,761,180 A | 6/1998 | Murabayashi et al. |
| 5,768,539 A | 6/1998 | Metz et al. |
| 5,796,786 A | 8/1998 | Lee |
| 5,796,829 A | 8/1998 | Newby et al. |
| 5,796,840 A | 8/1998 | Davis |
| 5,802,176 A | 9/1998 | Audebert |
| 5,805,700 A | 9/1998 | Nardone et al. |
| 5,805,712 A | 9/1998 | Davis |
| 5,805,762 A | 9/1998 | Boyce et al. |
| 5,809,147 A | 9/1998 | De Lange et al. |
| 5,815,146 A | 9/1998 | Youden et al. |
| 5,818,934 A | 10/1998 | Cuccia |
| 5,825,879 A | 10/1998 | Davis |
| 5,835,668 A | 11/1998 | Yanagihara |
| 5,838,873 A | 11/1998 | Blatter et al. |
| 5,850,218 A | 12/1998 | LaJoie et al. |
| 5,852,290 A | 12/1998 | Chaney |
| 5,852,470 A | 12/1998 | Kondo et al. |
| 5,859,662 A | 1/1999 | Cragun et al. |
| 5,870,474 A | 2/1999 | Wasiliewski et al. |
| 5,892,900 A | 4/1999 | Ginter et al. |
| 5,894,320 A | 4/1999 | Vancelette |
| 5,894,516 A | 4/1999 | Brandenburg |
| 5,905,732 A | 5/1999 | Fimoff et al. |
| 5,914,719 A | 6/1999 | Herz |
| 5,915,018 A | 6/1999 | Aucsmith |
| 5,917,830 A | 6/1999 | Chen et al. |
| 5,920,626 A | 7/1999 | Durden et al. |
| 5,922,048 A | 7/1999 | Eumura |
| 5,923,755 A | 7/1999 | Birch |
| 5,930,361 A | 7/1999 | Hayashi et al. |
| 5,933,500 A | 8/1999 | Blatter et al. |
| 5,940,738 A | 8/1999 | Rao |
| 5,943,605 A | 8/1999 | Koepele, Jr. |
| 5,949,877 A | 9/1999 | Traw et al. |
| 5,949,881 A | 9/1999 | Davis |
| 5,963,909 A | 10/1999 | Warren et al. |
| 5,973,679 A | 10/1999 | Abbott et al. |
| 5,973,722 A | 10/1999 | Wakai et al. |
| 5,973,726 A | 10/1999 | Iijima et al. |
| 5,999,622 A | 12/1999 | Yasukawa et al. |
| 5,999,698 A | 12/1999 | Nakai et al. |
| 6,005,561 A | 12/1999 | Hawkins et al. |
| 6,005,940 A | 12/1999 | Kulinets |

| | | | |
|---|---|---|---|
| 6,011,849 A | 1/2000 | Orrin | |
| 6,012,144 A | 1/2000 | Pickett | |
| 6,016,348 A | 1/2000 | Blatter et al. | |
| 6,021,199 A | 2/2000 | Isibashi | |
| 6,021,201 A | 2/2000 | Bakhle et al. | |
| 6,026,164 A | 2/2000 | Sakamoto et al. | |
| 6,028,932 A | 2/2000 | Park | |
| 6,049,613 A | 4/2000 | Jakobsson | |
| 6,055,314 A | 4/2000 | Spies et al. | |
| 6,055,315 A | 4/2000 | Doyle et al. | |
| 6,057,832 A | 5/2000 | Lev et al. | |
| 6,058,186 A | 5/2000 | Enari | |
| 6,058,192 A | 5/2000 | Guralnick et al. | |
| 6,061,451 A | 5/2000 | Muratani et al. | |
| 6,064,676 A | 5/2000 | Slattery et al. | |
| 6,064,748 A | 5/2000 | Hogan | |
| 6,065,050 A | 5/2000 | DeMoney | |
| 6,069,647 A | 5/2000 | Sullivan et al. | |
| 6,070,245 A | 5/2000 | Murphy, Jr. et al. | |
| 6,072,872 A | 6/2000 | Chang et al. | |
| 6,072,873 A | 6/2000 | Bewick | |
| 6,073,122 A | 6/2000 | Wool | |
| 6,088,450 A | 7/2000 | Davis et al. | |
| 6,105,134 A | 8/2000 | Pinder et al. | |
| 6,108,422 A | 8/2000 | Newby et al. | |
| 6,115,057 A * | 9/2000 | Kwoh et al. | 725/28 |
| 6,115,821 A | 9/2000 | Newby et al. | |
| 6,118,873 A | 9/2000 | Lotspiech et al. | |
| 6,134,237 A | 10/2000 | Brailean et al. | |
| 6,134,551 A | 10/2000 | Aucsmith | |
| 6,138,237 A | 10/2000 | Ruben et al. | |
| 6,148,082 A | 11/2000 | Slattery et al. | |
| 6,154,206 A | 11/2000 | Ludtke | |
| 6,157,719 A | 12/2000 | Wasilewski et al. | |
| 6,160,548 A | 12/2000 | Lea et al. | |
| 6,166,780 A | 12/2000 | Bray | |
| 6,170,075 B1 | 1/2001 | Schuster et al. | |
| 6,181,334 B1 | 1/2001 | Freeman et al. | |
| 6,181,364 B1 | 1/2001 | Ford et al. | |
| 6,185,369 B1 | 2/2001 | Ko et al. | |
| 6,185,546 B1 | 2/2001 | Davis | |
| 6,189,096 B1 | 2/2001 | Haverty | |
| 6,192,131 B1 | 2/2001 | Geer, Jr. et al. | |
| 6,199,053 B1 | 3/2001 | Herbert et al. | |
| 6,201,927 B1 | 3/2001 | Comer et al. | |
| 6,204,843 B1 | 3/2001 | Freeman et al. | |
| 6,209,098 B1 | 3/2001 | Davis | |
| 6,215,484 B1 | 4/2001 | Freeman et al. | |
| 6,216,263 B1 * | 4/2001 | Elam | 725/28 |
| 6,219,358 B1 | 4/2001 | Pinder et al. | |
| 6,222,924 B1 | 4/2001 | Salomaki | |
| 6,223,290 B1 | 4/2001 | Larsen et al. | |
| 6,226,385 B1 | 5/2001 | Taguchi et al. | |
| 6,226,618 B1 | 5/2001 | Downs et al. | |
| 6,229,576 B1 | 5/2001 | Tarr et al. | |
| 6,229,895 B1 | 5/2001 | Son et al. | |
| 6,230,194 B1 | 5/2001 | Frailong et al. | |
| 6,230,266 B1 | 5/2001 | Perlman et al. | |
| 6,236,727 B1 | 5/2001 | Ciacelli et al. | |
| 6,240,553 B1 | 5/2001 | Son et al. | |
| 6,246,720 B1 | 6/2001 | Kutner et al. | |
| 6,256,747 B1 | 7/2001 | Inohara et al. | |
| 6,263,506 B1 | 7/2001 | Ezaki et al. | |
| 6,266,416 B1 | 7/2001 | Sigbjornsen et al. | |
| 6,266,480 B1 | 7/2001 | Ezaki et al. | |
| 6,272,538 B1 | 8/2001 | Holden et al. | |
| 6,278,783 B1 | 8/2001 | Kocher et al. | |
| 6,289,455 B1 | 9/2001 | Kocher et al. | |
| 6,292,568 B1 | 9/2001 | Akins et al. | |
| 6,292,892 B1 | 9/2001 | Davis | |
| 6,307,939 B1 | 10/2001 | Vigarie | |
| 6,311,012 B1 | 10/2001 | Cho et al. | |
| 6,314,111 B1 | 11/2001 | Nandikonda et al. | |
| 6,324,288 B1 | 11/2001 | Hoffman | |
| 6,327,421 B1 | 12/2001 | Tiwari et al. | |
| 6,337,947 B1 | 1/2002 | Porter et al. | |
| 6,351,538 B1 | 2/2002 | Uz | |
| 6,351,813 B1 | 2/2002 | Mooney et al. | |
| 6,377,589 B1 | 4/2002 | Knight et al. | |
| 6,378,130 B1 | 4/2002 | Adams | |
| 6,389,533 B1 | 5/2002 | Davis et al. | |
| 6,389,537 B1 | 5/2002 | Davis et al. | |
| 6,415,031 B1 | 7/2002 | Colligan et al. | |
| 6,415,101 B1 | 7/2002 | deCarmo et al. | |
| 6,418,169 B1 | 7/2002 | Datari | |
| 6,424,717 B1 | 7/2002 | Pinder et al. | |
| 6,430,361 B2 | 8/2002 | Lee | |
| 6,445,738 B1 | 9/2002 | Zdepski et al. | |
| 6,449,718 B1 | 9/2002 | Rucklidge et al. | |
| 6,452,923 B1 | 9/2002 | Gerszberg et al. | |
| 6,453,115 B1 | 9/2002 | Boyle | |
| 6,453,116 B1 | 9/2002 | Ando et al. | |
| 6,456,985 B1 | 9/2002 | Ohtsuka | |
| 6,459,427 B1 | 10/2002 | Mao et al. | |
| 6,460,018 B1 | 10/2002 | Kasai et al. | |
| 6,466,671 B1 | 10/2002 | Maillard et al. | |
| 6,469,749 B1 * | 10/2002 | Dimitrova et al. | 348/722 |
| 6,473,459 B1 | 10/2002 | Sugano et al. | |
| 6,480,551 B1 | 11/2002 | Ohishi et al. | |
| 6,490,728 B1 | 12/2002 | Kitazato | |
| 6,505,032 B1 | 1/2003 | McCorkle et al. | |
| 6,505,299 B1 | 1/2003 | Zeng et al. | |
| 6,510,554 B1 | 1/2003 | Gordon et al. | |
| 6,519,693 B1 | 2/2003 | Debey | |
| 6,526,144 B2 | 2/2003 | Markandey et al. | |
| 6,529,526 B1 | 3/2003 | Schneidewend | |
| 6,543,053 B1 | 4/2003 | Li et al. | |
| 6,549,229 B1 | 4/2003 | Kirby et al. | |
| 6,550,008 B1 | 4/2003 | Zhang et al. | |
| 6,557,031 B1 | 4/2003 | Mimura et al. | |
| 6,587,561 B1 | 7/2003 | Sered et al. | |
| 6,590,979 B1 | 7/2003 | Ryan | |
| 6,621,866 B1 | 9/2003 | Florencio et al. | |
| 6,621,979 B1 | 9/2003 | Eerenberg et al. | |
| 6,640,145 B2 | 10/2003 | Hoffberg et al. | |
| 6,640,305 B2 | 10/2003 | Kocher et al. | |
| 6,643,298 B1 | 11/2003 | Brunheroto et al. | |
| 6,650,754 B1 | 11/2003 | Akiyama et al. | |
| 6,654,389 B1 | 11/2003 | Brunheroto et al. | |
| 6,678,740 B1 | 1/2004 | Rakib et al. | |
| 6,681,326 B2 | 1/2004 | Son et al. | |
| 6,684,250 B2 | 1/2004 | Anderson et al. | |
| 6,697,944 B1 | 2/2004 | Jones et al. | |
| 6,701,258 B2 | 3/2004 | Kramb et al. | |
| 6,707,696 B1 | 3/2004 | Turner et al. | |
| 6,714,650 B1 | 3/2004 | Maillard et al. | |
| 6,754,276 B1 | 6/2004 | Harumoto et al. | |
| 6,771,285 B1 | 8/2004 | McGrath et al. | |
| 6,772,340 B1 | 8/2004 | Peinado et al. | |
| 6,788,690 B2 | 9/2004 | Harri | |
| 6,788,882 B1 | 9/2004 | Geer et al. | |
| 6,826,185 B1 | 11/2004 | Montanaro et al. | |
| 6,853,728 B1 | 2/2005 | Kahn et al. | |
| 6,867,818 B2 * | 3/2005 | Bray | 348/632 |
| 6,883,050 B1 | 4/2005 | Safadi | |
| 6,891,565 B1 | 5/2005 | Dietrich | |
| 6,895,128 B2 | 5/2005 | Bohnenkamp | |
| 6,898,799 B1 | 5/2005 | Jarman | |
| 6,899,383 B2 | 5/2005 | Hwang | |
| 6,904,520 B1 | 6/2005 | Rosset et al. | |
| 6,917,684 B1 | 7/2005 | Tatebayashi et al. | |
| 6,925,180 B2 | 8/2005 | Iwamura | |
| 6,938,162 B1 | 8/2005 | Nagai et al. | |
| 6,972,802 B2 | 12/2005 | Bray | |
| 6,976,166 B2 | 12/2005 | Herley et al. | |
| 6,976,265 B1 * | 12/2005 | Yang et al. | 725/31 |
| 6,988,238 B1 | 1/2006 | Kovacevic et al. | |
| 7,039,802 B1 | 5/2006 | Eskicioglu et al. | |
| 7,054,547 B1 | 5/2006 | Abescassis | |
| 7,055,166 B1 | 5/2006 | Logan et al. | |
| 7,065,213 B2 | 6/2006 | Pinder | |
| 7,079,752 B1 | 7/2006 | Leyendecker | |
| 7,089,579 B1 | 8/2006 | Mao et al. | |
| 7,096,481 B1 | 8/2006 | Forecast et al. | |
| 7,096,487 B1 | 8/2006 | Gordon et al. | |
| 7,110,659 B2 | 9/2006 | Fujie et al. | |
| 7,127,619 B2 | 10/2006 | Unger et al. | |
| 7,139,031 B1 | 11/2006 | Bray | |

| | | |
|---|---|---|
| 7,146,007 B1 | 12/2006 | Maruo et al. |
| 7,158,185 B2 | 1/2007 | Gastaldi |
| 7,194,758 B1 | 3/2007 | Waki et al. |
| 7,221,706 B2 | 5/2007 | Zhao et al. |
| 7,292,692 B2 | 11/2007 | Bonan et al. |
| 7,336,785 B1 | 2/2008 | Lu et al. |
| 7,360,234 B2 * | 4/2008 | Robson et al. ............... 725/127 |
| 7,391,866 B2 | 6/2008 | Fukami et al. |
| 7,421,729 B2 * | 9/2008 | Zenoni .......................... 725/146 |
| 7,508,454 B1 | 3/2009 | Vantalon et al. |
| 2001/0013123 A1 | 8/2001 | Freeman et al. |
| 2001/0030959 A1 | 10/2001 | Ozawa et al. |
| 2001/0036271 A1 | 11/2001 | Javed |
| 2001/0051007 A1 | 12/2001 | Teshima |
| 2002/0003881 A1 | 1/2002 | Reitmeier et al. |
| 2002/0021805 A1 | 2/2002 | Schumann et al. |
| 2002/0026587 A1 | 2/2002 | Talstra et al. |
| 2002/0044558 A1 | 4/2002 | Gobbi et al. |
| 2002/0046406 A1 | 4/2002 | Chelehmal et al. |
| 2002/0047915 A1 | 4/2002 | Misu |
| 2002/0056093 A1 | 5/2002 | Kunkel et al. |
| 2002/0059425 A1 | 5/2002 | Belfiore et al. |
| 2002/0066101 A1 | 5/2002 | Gordon et al. |
| 2002/0067436 A1 | 6/2002 | Shirahama et al. |
| 2002/0083317 A1 | 6/2002 | Ohta et al. |
| 2002/0083438 A1 | 6/2002 | So et al. |
| 2002/0083439 A1 | 6/2002 | Eldering |
| 2002/0097322 A1 | 7/2002 | Monroe et al. |
| 2002/0100054 A1 | 7/2002 | Feinberg et al. |
| 2002/0108035 A1 | 8/2002 | Herley et al. |
| 2002/0109707 A1 | 8/2002 | Lao et al. |
| 2002/0116705 A1 | 8/2002 | Perlman et al. |
| 2002/0122136 A1 * | 9/2002 | Safadi et al. ................. 348/465 |
| 2002/0126890 A1 | 9/2002 | Katayama et al. |
| 2002/0129243 A1 | 9/2002 | Nanjundiah |
| 2002/0144116 A1 | 10/2002 | Giobbi |
| 2002/0144260 A1 | 10/2002 | Devara |
| 2002/0147782 A1 * | 10/2002 | Dimitrova et al. ............. 709/207 |
| 2002/0150239 A1 | 10/2002 | Carny et al. |
| 2002/0157115 A1 | 10/2002 | Lu |
| 2002/0157116 A1 | 10/2002 | Jasinschi |
| 2002/0164022 A1 | 11/2002 | Strasser et al. |
| 2002/0170053 A1 | 11/2002 | Peterka et al. |
| 2002/0184506 A1 | 12/2002 | Perlman |
| 2002/0188567 A1 | 12/2002 | Candelore |
| 2002/0194589 A1 | 12/2002 | Cristofalo et al. |
| 2002/0194613 A1 | 12/2002 | Unger |
| 2002/0194619 A1 | 12/2002 | Chang et al. |
| 2002/0196939 A1 | 12/2002 | Unger et al. |
| 2002/0199208 A1 | 12/2002 | Chang et al. |
| 2003/0002854 A1 | 1/2003 | Belknap et al. |
| 2003/0009669 A1 | 1/2003 | White et al. |
| 2003/0012286 A1 | 1/2003 | Ishtiaq et al. |
| 2003/0021412 A1 | 1/2003 | Candelore et al. |
| 2003/0026423 A1 | 2/2003 | Unger et al. |
| 2003/0026523 A1 | 2/2003 | Chua et al. |
| 2003/0028879 A1 | 2/2003 | Gordon et al. |
| 2003/0034997 A1 | 2/2003 | McKain et al. |
| 2003/0035482 A1 | 2/2003 | Klompenhouwer et al. |
| 2003/0035540 A1 | 2/2003 | Freeman et al. |
| 2003/0035543 A1 | 2/2003 | Gillon |
| 2003/0046686 A1 | 3/2003 | Candelore et al. |
| 2003/0046687 A1 | 3/2003 | Hodges et al. |
| 2003/0059047 A1 | 3/2003 | Iwamura |
| 2003/0063615 A1 | 4/2003 | Iuoma et al. |
| 2003/0072555 A1 | 4/2003 | Yap et al. |
| 2003/0077071 A1 | 4/2003 | Lin et al. |
| 2003/0081630 A1 | 5/2003 | Mowrey et al. |
| 2003/0081776 A1 | 5/2003 | Candelore |
| 2003/0084284 A1 | 5/2003 | Ando et al. |
| 2003/0097662 A1 | 5/2003 | Russ et al. |
| 2003/0105679 A1 | 6/2003 | Krishnan et al. |
| 2003/0112333 A1 | 6/2003 | Chen et al. |
| 2003/0118243 A1 | 6/2003 | Sezer et al. |
| 2003/0123664 A1 | 7/2003 | Pedlow, Jr. et al. |
| 2003/0123849 A1 | 7/2003 | Nallur et al. |
| 2003/0126086 A1 | 7/2003 | Safadi |
| 2003/0140257 A1 | 7/2003 | Peterka et al. |
| 2003/0145329 A1 | 7/2003 | Candelore |
| 2003/0152224 A1 | 8/2003 | Candelore et al. |
| 2003/0159139 A1 | 8/2003 | Candelore et al. |
| 2003/0159140 A1 | 8/2003 | Candelore |
| 2003/0159152 A1 | 8/2003 | Lin et al. |
| 2003/0163832 A1 | 8/2003 | Tsuria et al. |
| 2003/0174837 A1 | 9/2003 | Candelore et al. |
| 2003/0174844 A1 | 9/2003 | Candelore |
| 2003/0188154 A1 | 10/2003 | Dallard |
| 2003/0188164 A1 | 10/2003 | Okimoto et al. |
| 2003/0190054 A1 | 10/2003 | Troyansky et al. |
| 2003/0193973 A1 | 10/2003 | Takashimizu et al. |
| 2003/0194211 A1 * | 10/2003 | Abecassis ....................... 386/69 |
| 2003/0198223 A1 | 10/2003 | Mack et al. |
| 2003/0204717 A1 | 10/2003 | Kuehnel |
| 2003/0206631 A1 | 11/2003 | Candelore |
| 2003/0226149 A1 | 12/2003 | Chun et al. |
| 2003/0228018 A1 | 12/2003 | Vince |
| 2004/0003008 A1 | 1/2004 | Wasilewski et al. |
| 2004/0010717 A1 | 1/2004 | Simec et al. |
| 2004/0021764 A1 | 2/2004 | Driscoll, Jr. et al. |
| 2004/0028227 A1 | 2/2004 | Yu et al. |
| 2004/0037421 A1 | 2/2004 | Truman |
| 2004/0039648 A1 | 2/2004 | Candelore et al. |
| 2004/0047470 A1 | 3/2004 | Candelore |
| 2004/0049688 A1 | 3/2004 | Candelore et al. |
| 2004/0049690 A1 | 3/2004 | Candelore et al. |
| 2004/0049691 A1 | 3/2004 | Candelore et al. |
| 2004/0049694 A1 | 3/2004 | Candelore |
| 2004/0049708 A1 * | 3/2004 | Thomas et al. ............... 713/500 |
| 2004/0049780 A1 * | 3/2004 | Gee ................................ 725/32 |
| 2004/0064688 A1 | 4/2004 | Jacobs |
| 2004/0068659 A1 | 4/2004 | Diehl |
| 2004/0073917 A1 | 4/2004 | Pedlow, Jr. et al. |
| 2004/0078575 A1 | 4/2004 | Morten et al. |
| 2004/0081333 A1 | 4/2004 | Grab et al. |
| 2004/0083177 A1 | 4/2004 | Chen et al. |
| 2004/0083484 A1 | 4/2004 | Ryal |
| 2004/0086127 A1 | 5/2004 | Candelore |
| 2004/0088552 A1 | 5/2004 | Candelore |
| 2004/0088558 A1 | 5/2004 | Candelore |
| 2004/0091109 A1 | 5/2004 | Son et al. |
| 2004/0091239 A1 | 5/2004 | Poslinski et al. |
| 2004/0100510 A1 | 5/2004 | Milic-Frayling et al. |
| 2004/0123094 A1 | 6/2004 | Sprunk |
| 2004/0136532 A1 | 7/2004 | Pinder et al. |
| 2004/0139337 A1 | 7/2004 | Pinder et al. |
| 2004/0151314 A1 | 8/2004 | Candelore |
| 2004/0158721 A1 | 8/2004 | Candelore |
| 2004/0165586 A1 | 8/2004 | Read et al. |
| 2004/0168121 A1 | 8/2004 | Matz |
| 2004/0172650 A1 | 9/2004 | Hawkins et al. |
| 2004/0181666 A1 | 9/2004 | Candelore |
| 2004/0187161 A1 | 9/2004 | Cao |
| 2004/0189690 A1 | 9/2004 | Poslinski et al. |
| 2004/0193550 A1 | 9/2004 | Siegal |
| 2004/0205812 A1 | 10/2004 | Candelore |
| 2004/0216169 A1 * | 10/2004 | Fujiwara ....................... 725/135 |
| 2004/0240668 A1 | 12/2004 | Bonan et al. |
| 2004/0247122 A1 | 12/2004 | Hobrock et al. |
| 2004/0255321 A1 * | 12/2004 | Matz ................................ 725/14 |
| 2004/0261099 A1 | 12/2004 | Durden et al. |
| 2004/0264924 A1 | 12/2004 | Campisano et al. |
| 2004/0267602 A1 | 12/2004 | Gaydos et al. |
| 2005/0002385 A1 | 1/2005 | Candelore |
| 2005/0004875 A1 | 1/2005 | Kontio et al. |
| 2005/0015816 A1 | 1/2005 | Christofalo et al. |
| 2005/0028193 A1 | 2/2005 | Candelore et al. |
| 2005/0036067 A1 | 2/2005 | Ryal et al. |
| 2005/0058291 A1 | 3/2005 | Candelore |
| 2005/0066357 A1 | 3/2005 | Ryal et al. |
| 2005/0071669 A1 | 3/2005 | Medvinsky et al. |
| 2005/0071888 A1 * | 3/2005 | Girouard et al. ............... 725/136 |
| 2005/0094808 A1 | 5/2005 | Pedlow, Jr. et al. |
| 2005/0094809 A1 | 5/2005 | Pedlow, Jr. et al. |
| 2005/0097596 A1 | 5/2005 | Pedlow, Jr. |
| 2005/0097598 A1 | 5/2005 | Pedlow, Jr. et al. |
| 2005/0097614 A1 | 5/2005 | Pedlow, Jr. et al. |
| 2005/0129233 A1 | 6/2005 | Pedlow, Jr. |
| 2005/0141713 A1 | 6/2005 | Genevois |

| | | | |
|---|---|---|---|
| 2005/0198586 | A1 | 9/2005 | Sekiguchi et al. |
| 2005/0259813 | A1 | 11/2005 | Wasilewski et al. |
| 2005/0265547 | A1 | 12/2005 | Strasser et al. |
| 2005/0283797 | A1 | 12/2005 | Eldering et al. |
| 2006/0064715 | A1* | 3/2006 | Poslinski ............ 725/28 |
| 2006/0130119 | A1 | 6/2006 | Candelore et al. |
| 2006/0136976 | A1 | 6/2006 | Coupe et al. |
| 2006/0236220 | A1 | 10/2006 | Jarman |
| 2006/0262219 | A1 | 11/2006 | Molaro et al. |
| 2007/0091886 | A1 | 4/2007 | Davis et al. |
| 2007/0118801 | A1* | 5/2007 | Harshbarger et al. ......... 715/730 |
| 2007/0154176 | A1 | 7/2007 | Elcock et al. |
| 2007/0186236 | A1 | 8/2007 | Jarman |
| 2007/0288516 | A1 | 12/2007 | Jarman |

FOREIGN PATENT DOCUMENTS

| | | |
|---|---|---|
| EP | 0527611 | 7/1992 |
| EP | 0558016 | 2/1993 |
| EP | 0596826 | 4/1993 |
| EP | 0610587 | 12/1993 |
| EP | 0680209 | 4/1995 |
| EP | 0674440 | 9/1995 |
| EP | 0674441 | 9/1995 |
| EP | 0696141 | 2/1996 |
| EP | 0720374 | 7/1996 |
| EP | 0833517 | 4/1998 |
| EP | 0866615 | 9/1998 |
| EP | 1187483 | 3/2002 |
| JP | 7067028 | 3/1995 |
| WO | WO-86/07224 | 12/1986 |
| WO | WO-97/38530 | 10/1997 |
| WO | WO-00/31964 | 6/2000 |
| WO | WO-0165762 | 9/2001 |
| WO | WO-01/78386 | 10/2001 |
| WO | WO-02/51096 | 6/2002 |

OTHER PUBLICATIONS

"Automatic Generation of a Multimedia Encyclopedia from TV Programs by Using Closed Captions and Detecting Principal Video Objects," NHK Sci &Tech. Res. Labs, Tokyo, Dec. 2006, pp. 873-880.

"Automatic News Video Segmentation and Categorization Based on Closed-Captioned Text," University of Illinois, Aug. 22-25, 2001, pp. 829-832.

Office Action, Office Action dated Apr. 1, 2009 for U.S. Appl. No. 11/227,584.

Office Action, Office Action dated Oct. 8, 2008 for U.S. Appl. No. 11/227,584.

"Ad Agencies and Advertisers to Be Empowered with Targeted Ads Delivered by Television's Prevailing Video Servers", *Article Business Sectionof the New York Times*, Updated Thursday, Dec. 20, 2001.

"ClearPlay: The Technology of Choice", from web site, Clearplay 2001-2003.

"Dynamic-Customized TV Advertising Creation and Production Tools", *by SeaChange International*, Web Site Literature.

"How Networks Work—Millenium Edition", *Que Corporation*, (2000), pp. 88-89.

"Metro Media tm PVR-DVD-MP3-Web—Internet publication from www.metrolink.com, undated".

"Passage tm, Freedom to Choose", *Sony Electronics Inc.*, (2003).

"Pre-Encryption Profiles—Concept Overview and Proposal", *Rev. 1.2 as submitted to the Open CAS consortium* on Dec. 28, 2000.

Anonymous, *Message Authentication with Partial Encryption, Research disclosure RD 296086*, (Dec. 10, 1998).

Aravind, H. , et al., "Image and Video Coding Standards", *AT&T Technical Journal*, (Jan./Feb. 1993), pp. 67-68.

By Agi and Gong, "An Empirical Study of Secure MPEG Video Transmissions", *IEEE, Proceedings of SNDSS '96*, (1996), pp. 137-144.

By Alattar and Al-Regib, "Evaluation of Selective Encryption Techniques for Secure Transmission of MPEG-Compressed bit-Streams", *IEEE*, (1999), pp. IV-343.

By Alattar, Al-Regib & Al-Semari, "Improved Selective Encryption Techniques for Secure Transmission of MPEG Video Bit-Streams", *IEEE*, (1999), pp. 256-260.

By Haberman, "Visible World—A High Impact Approach to Customized Television Advertising", (Dec. 2001).

By Kunkelman, "Applying Encryption to Video Communication", *Multimedia and Security Workshop at ACM Multimedia '98*Bristol, U.K., (Sep. 1998), pp. 41-47.

By Rosenblatt, Bill , "Coral Consortium Aims to Make DRM Interoperable", online at www.drmwatch.com/standards/article.php/3418741, (Oct. 7, 2004).

By Wu and Kuo, "Fast Encryption Methods for Audiovisual Data Confidentiality", *SPIE International Symposia on Information Technologies 2000*, (Boston, Ma., USA), (Nov. 2000).

By Wu and Wu, "Run-Time Performance Evaluation for a Secure MPEG System Supporting Both Selective Watermarking and Encrytion", *submitted to JSAC special issue on Copyright and Privacy Protection*, (Mar. 1, 1997).

Gonzalez, R.C. , et al., "Digital Image Processing", *Addison Wesley Publishing Company, Inc.*, (1992), pp. 346-348.

Kim, et al., "Bit Rate Reduction Algorithm for a Digital VCR", *IEEE Transactions on Consumer Electronics*, vol. 37, No. 3, (Aug. 1, 1992), pp. 267-274.

Kondo, et al., "A New Concealment Method for Digital VCRs", *IEEE Visual Signal Processing and Communication*, Melbourne Australia, (Sep. 1993), pp. 20-22.

Kondo, et al., "Adaptive Dynamic Range Coding Scheme for Future HDTV Digital VTR", *Sony Corporation*, (1991).

Kunkelmann, T. , et al., "A Scalable Security Architecture for Multimedia Communication Standards", *Darmstard Univ. of Technology*, ITO, Germany, (1997), pp. 660-661.

Lookabaugh, et al., "Selective Encryption and MPEG-2", *ACM Multimedia '03*, (Nov. 2001).

Menezes, Alfred J., et al., "Handbook of Applied Cryptography", *CRC Press*, pp. 551-553.

NHK Laboratories Note, "Error Correction, Concealment and Shuffling", *No. 424*, (Mar. 1994), pp. 29-44.

Park, et al., "A Simple Concealment for ATM Bursty Cell Loss", *IEEE Transactions on Consumer Electronics*, No. 3, (Aug. 1993), pp. 704-709.

Zhu, et al., "Coding and Cell-Loss Recovery in DCT-Based Packet Video", *IEEE Transactions on Circuits and Systems for Video Technology*, No. 3, NY, (Jun. 3, 1993).

\* cited by examiner

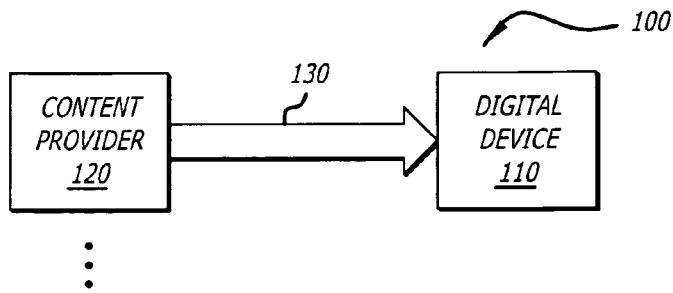
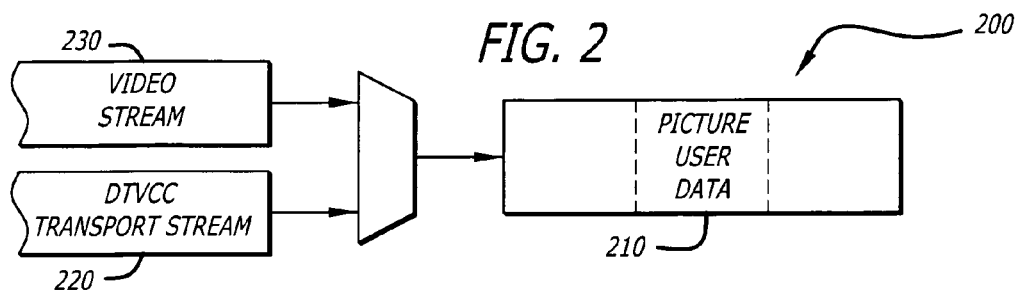
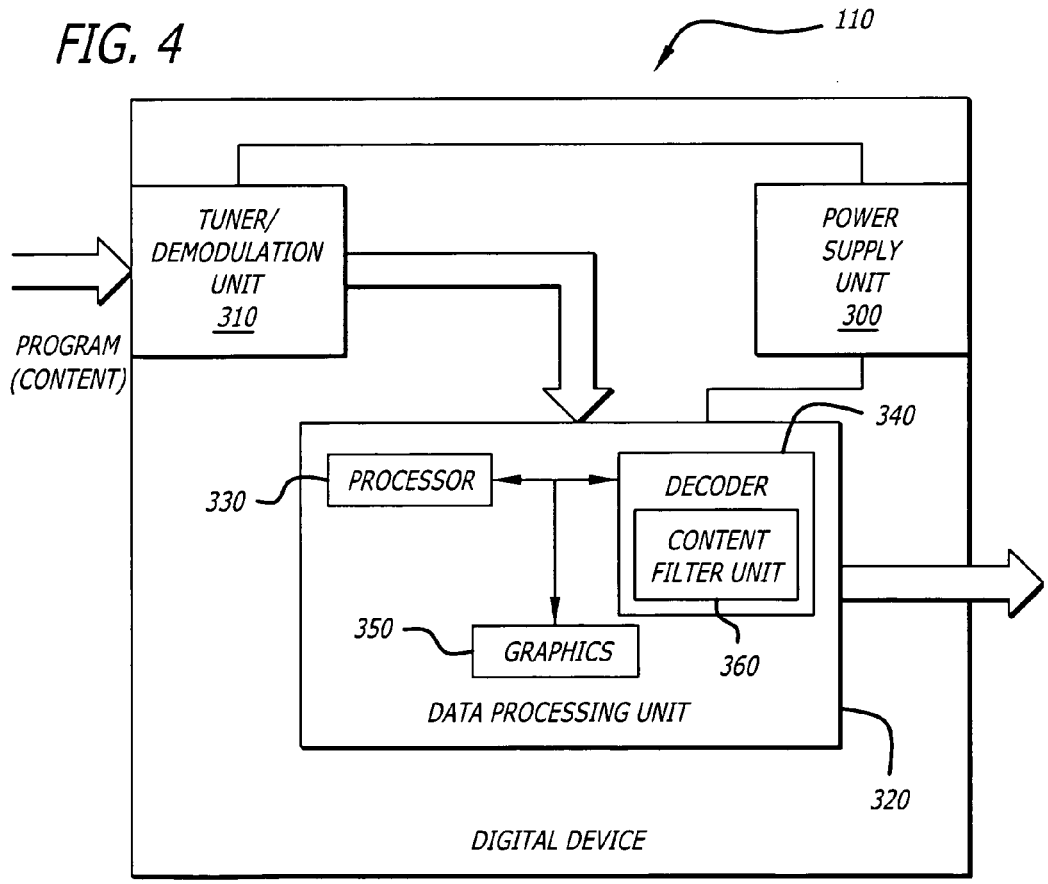

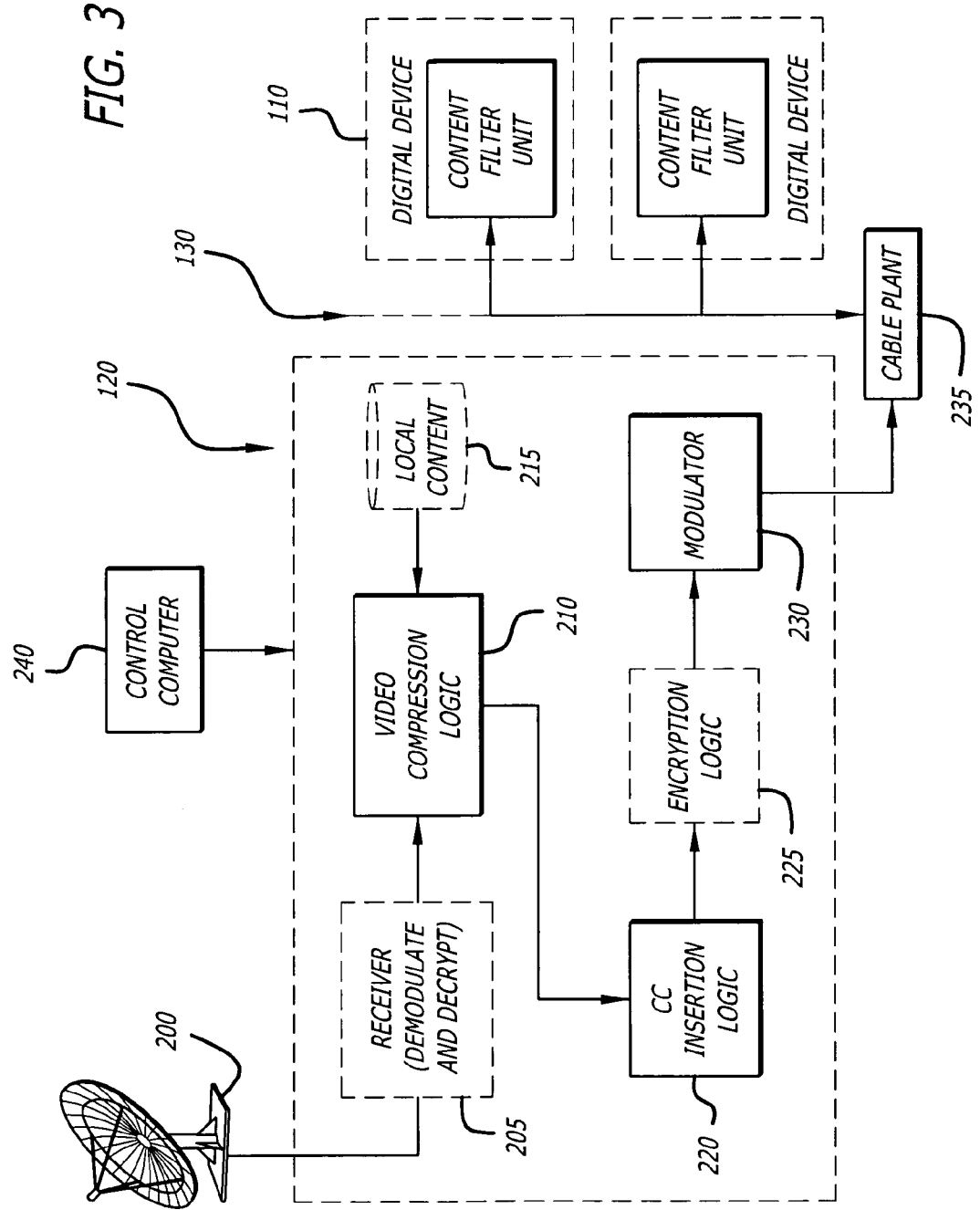

PARENTAL CONTROL OF DISPLAYED CONTENT USING CLOSED CAPTIONING

BACKGROUND

1. Field

Embodiments of the invention relate to parental control of digital content. More specifically, one embodiment of the invention relates to an apparatus and method for elimination of unwanted content on a scene-by-scene basis.

2. General Background

Television is used to deliver content, such as entertainment and educational programs, to viewers. A growing number of parents are now watching and listening to content perceived by their children, in an effort to better mitigate their exposure to objectionable content, namely violence, sexual situations, indecent or suggestive language and the like.

Currently, with respect to the rendering of video programs, televisions are implemented with a V-chip, which may be set by parents to preclude the playback of programs that exceed a selected age-based rating. A black screen is shown for any program that exceeds the selected age-based rating in order to prevent such viewing. This program blocking can be disabled with a parental password.

There are a number of major shortcomings of the V-chip. For instance, the V-chip filters only at the program level, namely a viewer gets to view the entire program or nothing at all. In other words, there are no intermediate levels of blocking, which prevents the playback of certain programs that would be appropriate and perhaps educational for children if certain images or audio were eliminated. Also, how programs are rated is still a subjective task, and the assigned ratings may not be consistent with the views of certain parents. As an example, some programs with violence or drug use may receive a lower rating than programs with indecent language, but certain parents might consider violence to be more objectionable. Yet another V-chip shortcoming is that it is unable to filter commercials or other advertisements, news clips or live sporting events since this content is not rated.

The marketplace already features filters, but none of which provide any capability of scene-to-scene filtering and content replacement. For instance, a CLEARPLAY® DVD player from RCA has the ability to use downloadable filters synchronized to the playback of the DVD to squelch violence, nudity, swearing and other content that some may find objectionable. However, this product is directed to DVD video data streams.

Another filter is a language filter from TVGuardian, which operates only on audio. This filter relies on closed captioning information to automatically detect and filter audio which some might find objectionable. When objectionable audio is detected, sound is muted and alternate closed captioning text is displayed on the screen. No video blocking is offered.

BRIEF DESCRIPTION OF THE DRAWINGS

Embodiments of the invention are illustrated by way of example and not by way of limitation in the figures of the accompanying drawings, in which like references indicate similar elements and in which:

FIG. 1 is an exemplary block diagram of a content delivery system consistent with certain embodiments of the invention.

FIG. 2 is an exemplary block diagram of video packet in accordance with a selected compressed format that is transmitted over the content delivery system.

FIG. 3 is an exemplary block diagram of a content provider consistent with certain embodiments of the invention.

FIG. 4 is an exemplary diagram of a content filter unit implemented within a digital device of the content delivery system of FIG. 1.

DETAILED DESCRIPTION

Figure 5:
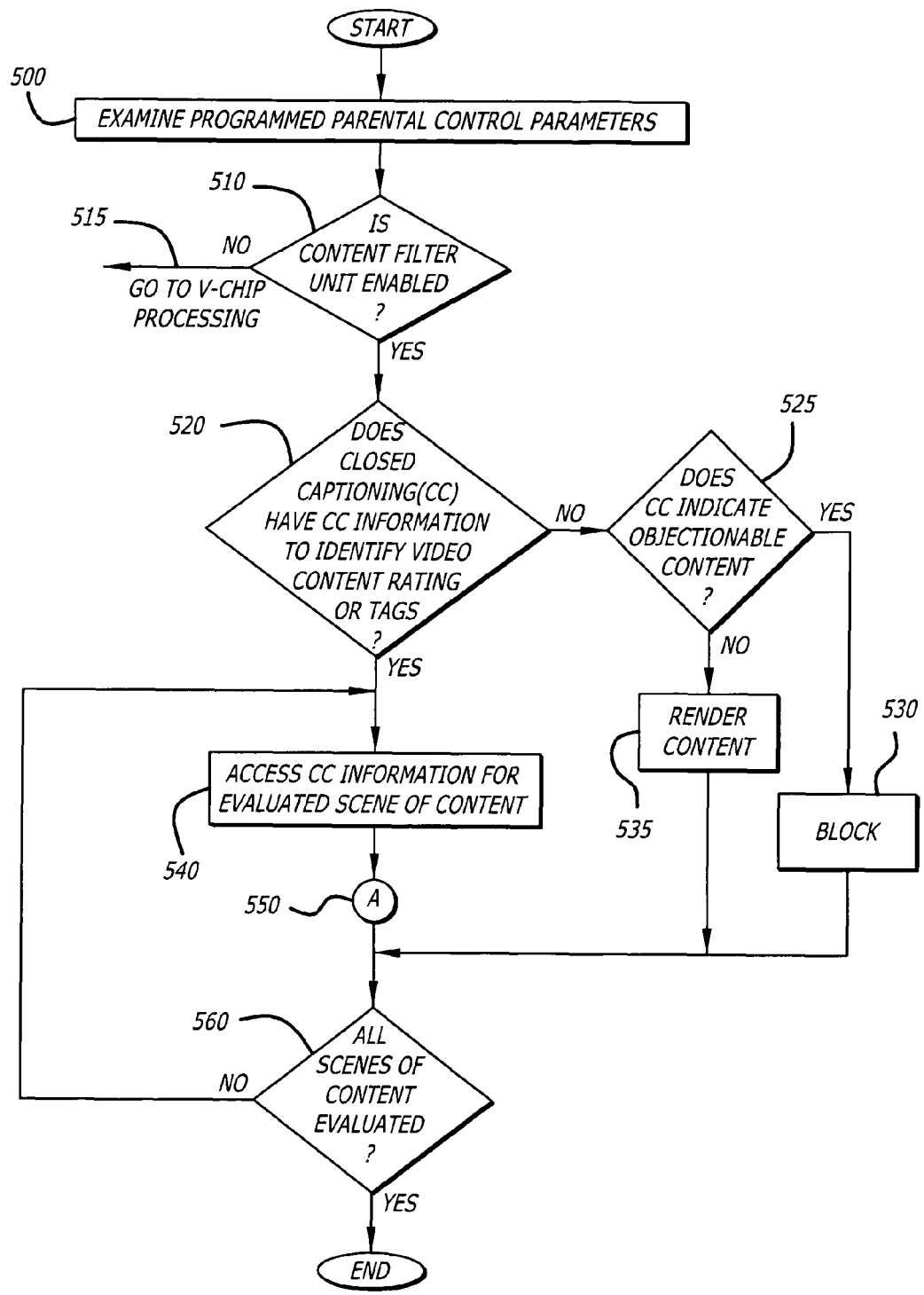
FIG. 5 is an illustrative flowchart of a process for determining whether a segment of content associated with a program should be prevented from being displayed.

Various embodiments of the invention relate to an apparatus, system and method for parental control of digital content. According to one embodiment of the invention, a content filter unit is implemented within a digital device and is configured to provide parental control by performing scene-by-scene evaluation of incoming content (e.g., video, one or more images, or the like) based on closed captioning (CC) information. Upon detecting objectionable content, the displayable images associated with the content are blocked. The term "blocked" (and other tenses) is generally defined as an action where one or more displayable images are obscured from view. For instance, displayed content may be blocked by distorting the displayed images (e.g., distort pixels at selected locations of the displayed content), by placing an opaque shape over the entire display area (screen blocking), or by placing an opaque shape over selected areas of display. Of course, other blocking techniques may be used other than those disclosed.

In short, the content filter unit provides scene-by-scene filtration, and even to the granularity of frame-by-frame, to block individual scenes of video. All content that utilizes closed captioning, including advertisements, news, sporting events and the like may be filtered as well in lieu of just movies and television shows.

For purposes of the present description, the term "digital device" may refer to a television that is adapted to tune, receive, decrypt, descramble and/or decode transmissions from any content provider. Examples of "content providers" may include a terrestrial broadcaster, a cable or satellite television distribution system, or a company providing content for download over the Internet or other Internet Protocol (IP) based networks like an Internet service provider. However, it is contemplated that the digital device may be of another form factor besides a television, such as a set-top box, a personal digital assistant (PDA), a computer, a cellular telephone, a video game console, a portable video player such as a SONY® PSP® player or an APPLE® video iPOD™, a digital video recorder, or the like.

In the following description, certain terminology is used to describe features of the invention. For example, in certain situations, the terms "component," "unit" and "logic" are representative of hardware and/or software configured to perform one or more functions. For instance, examples of "hardware" include, but are not limited or restricted to an integrated circuit such as a processor (e.g., a digital signal processor, microprocessor, application specific integrated circuit, a micro-controller, etc.). Of course, the hardware may be alternatively implemented as a finite state machine or even combinatorial logic.

An example of "software" includes executable code in the form of an application, an applet, a routine or even a series of instructions. The software may be stored in any type of machine readable medium such as a programmable electronic circuit, a semiconductor memory device such as volatile memory (e.g., random access memory, etc.) and/or non-volatile memory (e.g., any type of read-only memory "ROM", flash memory, etc.), a floppy diskette, an optical disk (e.g., compact disk or digital video disc "DVD"), a hard drive disk, a tape, or the like.

In addition, the term "program" generally represents a stream of digital content that is configured for transmission to one or more digital devices for viewing and/or listening. According to one embodiment, the program may contain MPEG (Moving Pictures Expert Group) compliant compressed video. The "scene" may be generally defined as one or more frames of content, namely one or more frames video, one or more still images, or any combination thereof. For instance, as an example, a scene may include fifteen (15) consecutive frames of video.

Certain types of content, such as movies, have an associated content rating established by a supervisory body to inform potential viewers of the type of material that may form a part of the content. General ratings of G, PG, PG-13, R and NC-17 are commonly established for most movies produced in the United States by the Classification and Ratings Administration (CARA) of the Motion Picture Association (MPA) or the Motion Picture Association of America (MPAA). Television programming is similarly rated by the TV Parental Guidelines Monitoring Board, which provides ratings of TV-Y, TV-Y7, TV-Y7-FV, TV-G, TV-14 and TV-MA.

For purposes of this document, content having a rating provided under such rating systems will be referred to as having a "higher" rating if it is intended for more mature audiences, and a "lower" rating if it is intended for a more general or less mature audience. Hence, the previously described rating systems are listed from lowest to highest. Therefore, within this terminology, an R rating would be considered a "higher" rating than a G rating. Such nomenclature is defined herein for simplicity of description of the above rating system as well as equivalent systems, without intent for the nomenclature to pass any judgment on the quality of such content.

Additionally, the term "rating" is intended to embrace any suitable content rating system, domestic or foreign, public, private or even governmental that is formed to serve a similar function, but applied on a scene-by-scene basis. Such rating information may be added to closed captioning information included in a compressed video packet such as a MPEG compliant packet. As an alternative to (or in combination with) the rating information, tag information that identifies the particular subject matter of the scene may be added to the closed captioning information.

While this invention is susceptible to embodiments of many different forms, there is shown in the drawings and will herein be described in detail specific embodiments, with the understanding that the present disclosure is to be considered as an example of the principles of the invention and not intended to limit the invention to the specific embodiments shown and described.

I. General Overview

The content filter unit described below is a mechanism to block viewable content (and optionally audio content) to avoid exposing objectionable content to certain viewers. Content filtering can be applied not only to movies and television shows, but also to advertisements, sporting and news events and other content that could not be practically controlled. Thus, objectionable scenes in sporting or new events can be broadcast blocked at one digital device while remaining uncensored at another.

As an illustrative example, during the SUPERBOWL® sporting event in 2005, a CIALIS® commercial was shown. Thousands of families, with young sports enthusiasts at home, watched this advertisement since advertisements are treated as separate content to television shows and are not rated. Certain viewing audiences who found this subject matter to be objectionable had to closely monitor the televised commercials and to switch channels during its broadcast.

Also, live sporting events represent a special problem for parental control. Someone must watch the feed, recognize that something in the telecast would violate the sensibilities of the viewing public at large, and be ready to "pull the plug". This is especially difficult since the objectionable event might be something outside the principle focus, such as patrons in the stands.

The below-described content filter unit, however, is adapted to selectively control the viewing of commercials, sporting events, news reports or any other viewable content having closed captions that may be considered by the viewer as including objectionable content. This is accomplished by monitoring the closed captioning information provided with the incoming content, where the closed captioning information is associated with a particular scene.

II. General Architecture

Referring to FIG. 1, an exemplary block diagram of a content delivery system 100 consistent with certain embodiments of the invention is shown. Content delivery system 100 comprises a digital device 110 that receives digital content such as a program from one or more content providers 120. The program may be propagated as a digital data stream for example in compliance with any data compression scheme. Examples of a data compression scheme include, but are not limited or restricted to MPEG standards.

According to one embodiment of the invention, digital device 110 decodes an incoming program, and evaluates the content of the incoming program on a scene-by-scene basis. Such evaluation is performed using closed captioning information in order to determine whether such scenes include any objectionable content.

According to one embodiment of the invention, such evaluation may involve analysis of the closed captioning (CC) information to obtain clues or hints that the content for display might include objectionable content. The term "objectionable content" means that the content features certain subject matter that may be inappropriate for the targeted viewing or listening audience at this time.

According to another embodiment of the invention, the evaluation may involve analysis of the closed captioning information that includes ratings of a scene of content, tags identifying the type of content within the scene or a combination thereof. Illustrative evaluation schemes are described below.

Content provider 120 provides the digital content to digital device 110 through transmission medium 130, which operates as a communication pathway for the program within content delivery system 100. The transmission medium 130 may include, but is not limited to electrical wires, optical fiber, cable, a wireless link established by wireless signaling circuitry, or the like.

Referring now to FIG. 2, an exemplary embodiment of incoming digital content that comprises closed captioning information is shown. For clarity sake, digital content 200 includes picture user data 210 that includes closed captioning information. For instance, according to one embodiment of the invention, closed captioning information is part of a Digital Television Closed Captioning (DTVCC) Transport stream 220 that is injected into Picture User Data 210 of a video stream (e.g., MPEG-2 video stream) in accordance with EIA-708-B standard entitled "Digital Television (DTV) Closed Captioning" published December 1999. In other words, the closed captioning information is multiplexed into a compressed video stream 230 so as to form the incoming digital content. The packets with the captions are in picture order, and are rearranged just like picture frames are.

According to one embodiment of the invention, special caption commands may be inserted into the closed captioning information in order to identify certain ratings or subject matter (tags) of an associated scene of displayable content. According to another embodiment, the closed captioning information may utilize existing caption text function tags via the SetPenAttributes command (tagged "12" to "15") to include non-displayed text that can be used to include ratings or identify subject matter of the associated scene for display. Of course, the analysis of unmodified closed captioning information may be performed to gain insight over upcoming scenes for blocking purposes as well.

As shown in FIG. 3, content provider 120 may be adapted with an antenna/tuner 200 (e.g., satellite antenna, etc.) to receive incoming content. The incoming content is received, demodulated and decrypted at a receiver 205 before being routed to video compression logic 210. Alternatively or in addition to content from a remote source, content may be received from a local content database 215 or other sources of content.

The content then is routed to Closed Captioning (CC) insertion logic 220 that inserts closed captioning information into packets forming the transmitted video. For instance, the CC information may be loaded into the Picture User Data field of an MPEG packet as described above. It is contemplated that the closed captioning information may include text to illustrate dialogue or audio sounds during playback as normal, and may include additional closed captioning information that provides rating information of an upcoming scene or tag information used to identify the type of content within the upcoming scene.

If the content is to be encrypted, it may optionally pass through encryption logic 225 prior to modulation at a modulator (e.g., a QAM modulator) 230. The modulated content is then transmitted via transmission medium 130 to digital device 110 and perhaps other digital devices. For instance, the modulated content may be routed via a cable plant 235 to digital device 110 residing with the end users. The operation performed by content provider 120, including but not limited to closed captioning insertion, is carried out under control of a control computer 240.

Referring now to FIG. 4, an exemplary diagram of digital device 110 of the content delivery system 100 is shown. Digital device 110 comprises a power supply unit 300, a tuner/demodulation unit 310 and data processing unit 320. Power supply unit 300 is adapted to provide powered to tuner/demodulation unit 310 and data processing unit 320. Power supply unit 300 may provide regulated power based on input power received from a wall socket (e.g., 110 volts alternating current "VAC", 220 VAC, etc.). Tuner/demodulation unit 310 tunes to a channel to receive the program and demodulates an incoming program to recover the content. Then, the content is routed as a digital bit stream to data processing unit 320.

Data processing unit 320 comprises a processor 330 (e.g., central processing unit), a decoder 340 and a graphics component 350. These components may be implemented as separate integrated circuits or as a single integrated circuit (system-on-chip implementation) as shown.

According to one embodiment of the invention, decoder 340 is implemented with a content filter unit 360 that is adapted to decode the content during playback of video and/or audio. In general, according to one embodiment of the invention, content filter unit 360 is designed to render the video or to block display of the video based on findings by processor 330, which accesses information within closed captioning information to evaluate whether a scene has objectionable content.

According to one embodiment, processor 330 is adapted to process the closed captioning and emergency alert system (EAS) data as well as guide data. Hence, processor 330 may be adapted to access the closed captioning information in the Picture User Data of incoming MPEG packets in order to provide signaling to content filter unit 360 regarding the rating or subject matter within each upcoming scene of the incoming content before such content is displayed. This allows content filter unit 360 to determine whether the subject matter constitutes objectionable content.

Of course, it is contemplated that decoder 340 may be adapted to access the closed captioning information itself. Moreover, as an alternative embodiment, decoder 340 may be adapted to separate certain types of data, such as closed captioning or EAS data for processing by processor 330.

Graphics component 350 is adapted for rendering on-screen menus or guide data. For instance, processor 330 may be adapted to collect guide data and for storage of such guide data in local memory (not shown). When such data is requested, it is displayed by graphics component 350, which would overlay video concurrently displayed. Also, graphics component 350 may be adapted to distort or blank out (block) displayed images.

III. Content Replacement Techniques

Referring now to FIG. 5, an illustrative flowchart of a process for determining whether a segment of content associated with a program should be prevented from being displayed is shown. As illustrated, initially programmed parental control parameters are examined to determine what constitutes "objectionable content" for this content filter unit (block 500). The parental control parameters are preset as shown in FIGS. 7-10.

Next, a determination is made whether the content filter unit has been enabled (block 510). If not, the V-chip is used as an alternative source for regulating the content to be viewed (arrow 515). If the content filter unit has been enabled, a first evaluation is whether the program being transmitted features closed captioning (CC) information that identifies the rating (e.g., age or content based) or type of content (e.g., tags) for an incoming scene (block 520).

For each scene, a portion of the incoming content segment, such as the User Picture Data field for example, is accessed to retrieve closed captioning information therefrom. If the closed captioning information does not feature information to identify rating or type of content, as an alternative, the closed captioning information itself may be used to provide hints regarding upcoming scenes (block 525). For instance, certain descriptions of noises and spoken dialogue may be used to suggest a sexual or violent situation in an upcoming scene. Upon detection, the scene is blocked where the displayed content is completely or partially blocked from view (block 530). Otherwise, the content is rendered for display without filtering (block 535).

In the event that the closed captioning information includes information to identify rating or type of content, such information is accessed to evaluate the upcoming scene of content (block 540) to determine whether the incoming content should be blocked (block 550), and thereafter, continuing this process for each scene (block 560). The blocking scheme is set forth in FIG. 6.

Figure 6:
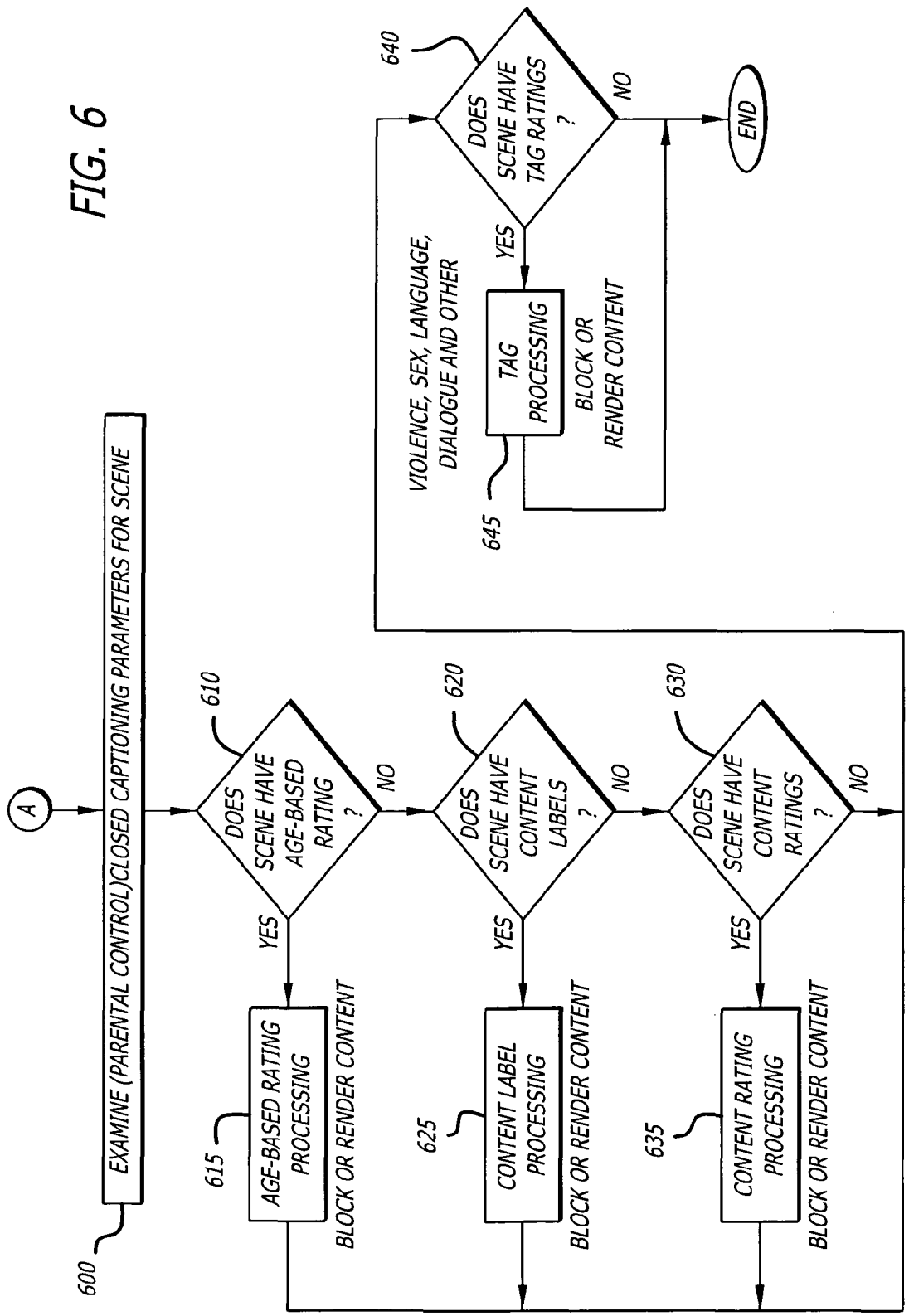
FIG. 6 is an illustrative flowchart of a process for blocking segments of content based on parental control parameters.

FIG. 6 provides an illustrative flowchart of a process for blocking content based on parental control parameters. Initially, as shown in block 600, parental control parameters associated with the scene are examined. Next, a determination is made whether the display of the scene is controlled based on an Age Rating (block 610). If so, Age-based rating processing is conducted where the Age Rating of the scene is compared to Aged-based parental control limits programmed by the end user and monitored by the content filter unit (block 615). In the event that the Age Rating of the scene exceeds the Aged-based parental control limits, the scene is not rendered, but instead may partially or completely blocked.

Figure 7:
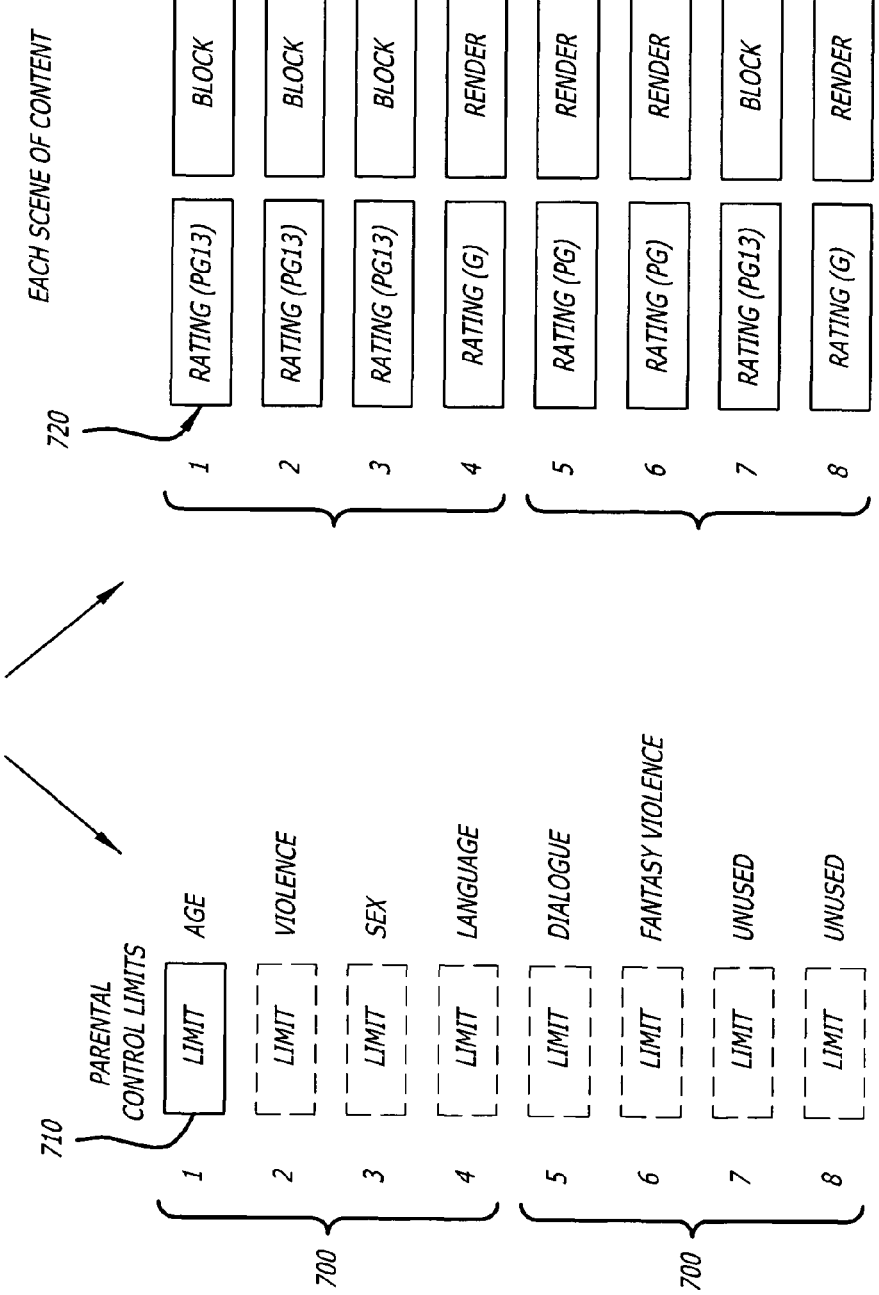
FIG. 7 is an exemplary embodiment of an Age-based Rating scheme for blocking of scenes including objectionable content.

For instance, as shown in FIG. 7, an exemplary ratings table 700 for objectionable content is shown. Herein, the content filter unit is programmed by setting an Age-based parental control limit within a first parental control parameter 710. As an example, the Age Rating is established to cover age-based rating levels G, PG, PG-13, R and NC-17 ratings used in movies as well as rating levels TV-Y, TV-Y7, TV-Y7-FV, TV-G, TV-14 and TV-MA used in television broadcasts. For instance, TV-14 may have the same Age rating level as PG-13 (V,S), where "V" denotes violence and "S" denotes sexual content.

As an illustrative example, a first scene 720 of a program may feature "PG-13" rated content, which is blocked if the Aged-based parental control limit is set to "PG". As a result, for "PG" Aged-based parental control limits set within first parental control parameter 710, content segments for scenes 4-6 and 8 would be rendered. However, content segments for scenes 1-3 and 7 would be blocked since the closed captioning information identifies that these scenes having a rating that exceeds "PG" Aged-based limits.

Referring back to FIG. 6, another determination is whether the display of the scene is controlled based on content label scheme (blocks 620 and 625). With respect to content label evaluation scheme, a determination is made if any particular category of content is present. This is similar to Content Rating scheme describe below where the "Intensity" parental control limits are set to "0", which also indicates that if there are any scenes having content with this subject matter, the scene is blocked.

Yet another determination is whether the display of the scene is controlled based on content rating scheme (block 630). If so, an Intensity rating is applied to a variety of subject matter categories that parents may find objectionable for their children (block 635). For instance, these categories may be broadly defined such as violence, sex, language, and the like. For those content segments that include this subject matter, "Intensity" values are assigned for each scene based on the maturity level of the subject matter.

Figure 8:
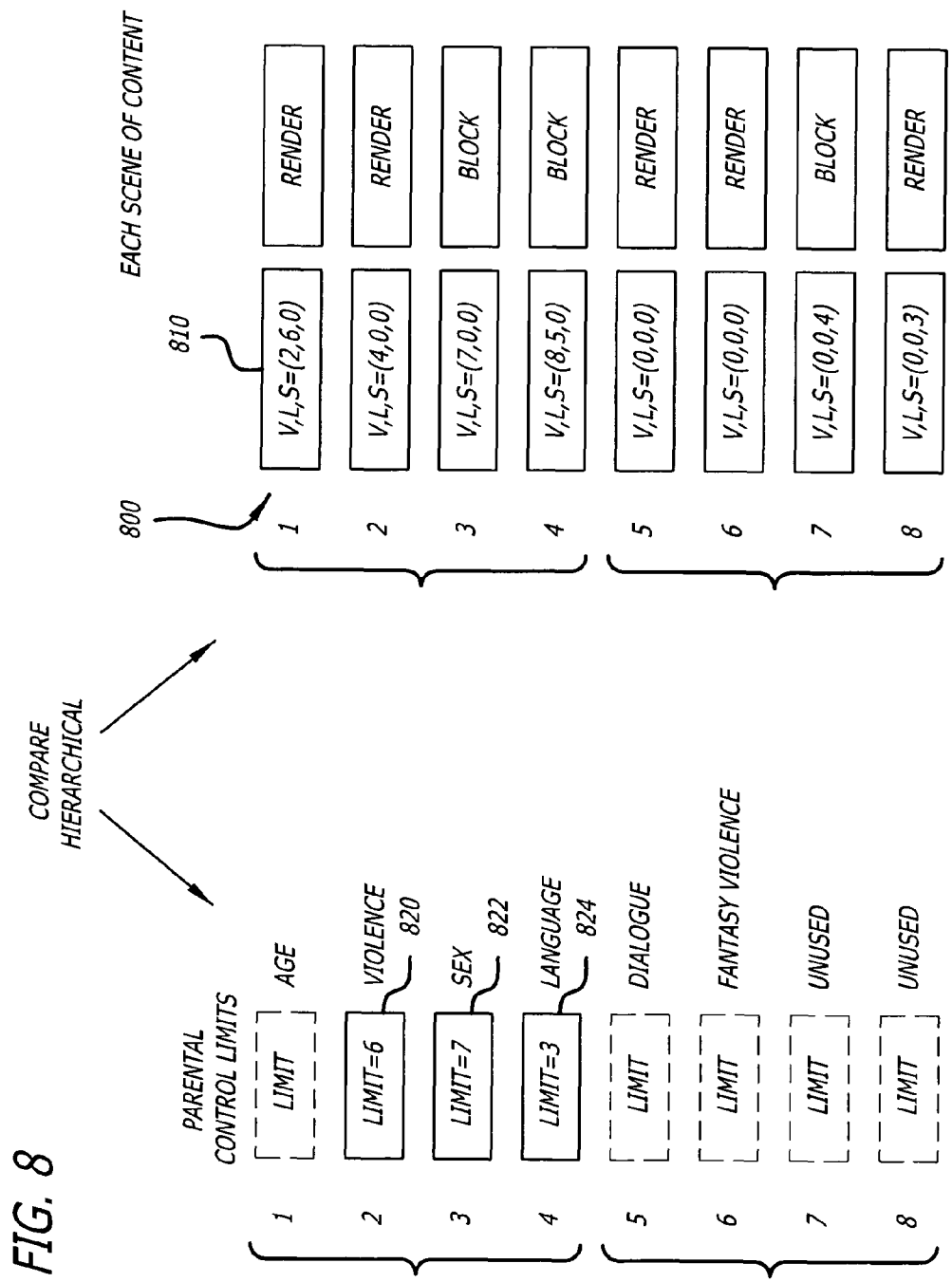
FIG. 8 is an exemplary embodiment of a Content-based Rating scheme for blocking of scenes including objectionable content.

As an illustrative example, as shown in FIG. 8, if a first scene 810 for incoming content 800 of a program includes a fist fight along with a curse word, the violence rating may be set to a first prescribed value, which will likely be fairly low (e.g., 2 out of 15). Depending on the curse word spoken and the audible nature of the curse word, the language rating may be set to a second prescribed value (e.g., 6 out of 15). Incoming content 800 is blocked if the parental control parameters for violence and language are less than "2" and "6", respectively. Otherwise, the original content is shown since these Intensity values are less than or equal to the parental control limits of "6", "7" and "3" for violence, language and sex parental control parameters 820, 822 and 824.

For these parent control limits, scenes 1, 5-6 and 8 of content 800 would be blocked while scenes 2-4 and 7 of content 800 would be rendered since the content associated with these scenes falls below the parental control limits selected. However, it is contemplated that the default setting can be configured to select the content segment having a rating closest to the parental control limits.

Figure 9:
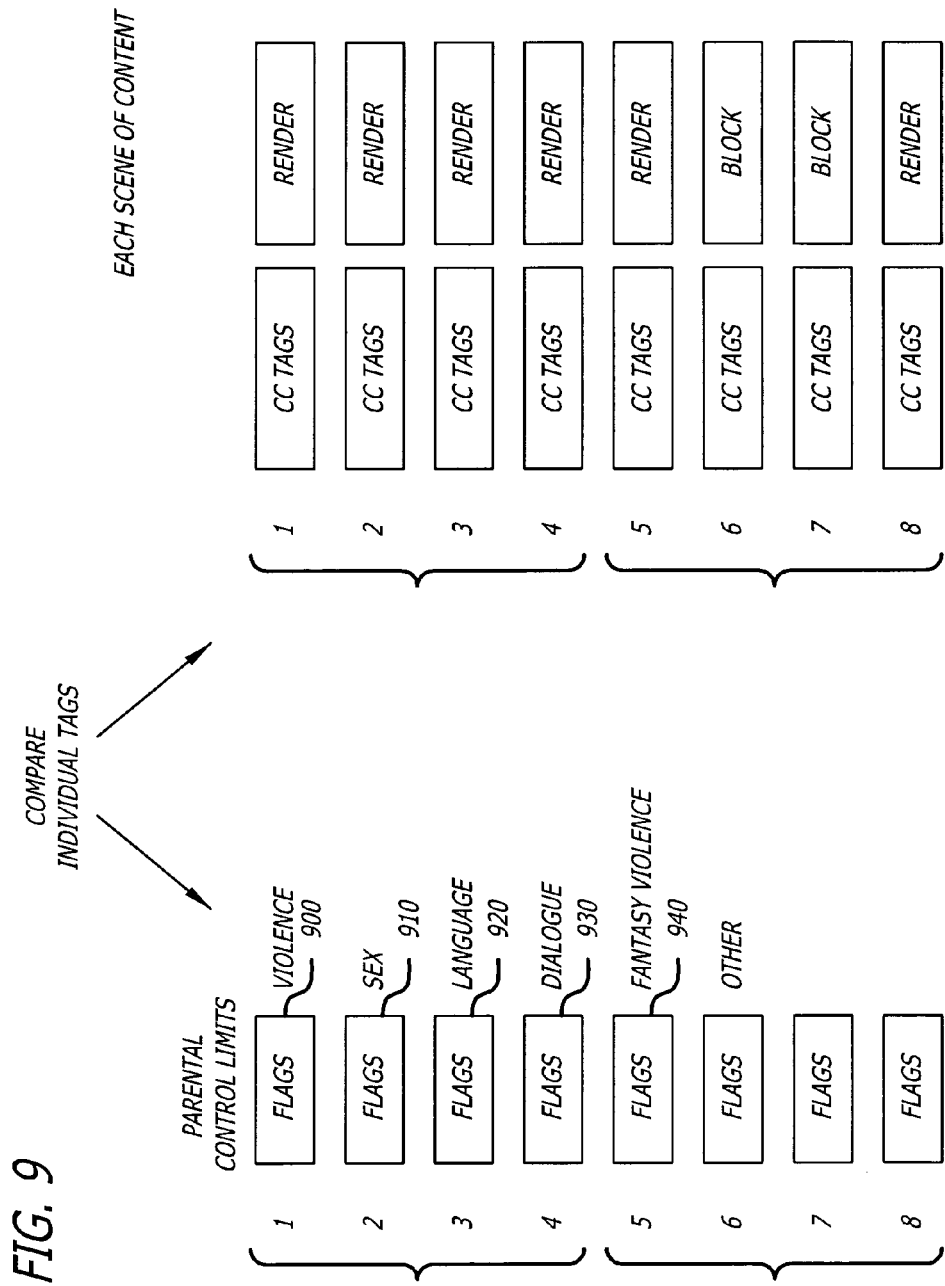
FIGS. 9 and 10 are exemplary embodiments of a Tag Rating scheme for blocking of scenes including objectionable content.
Figure 10:
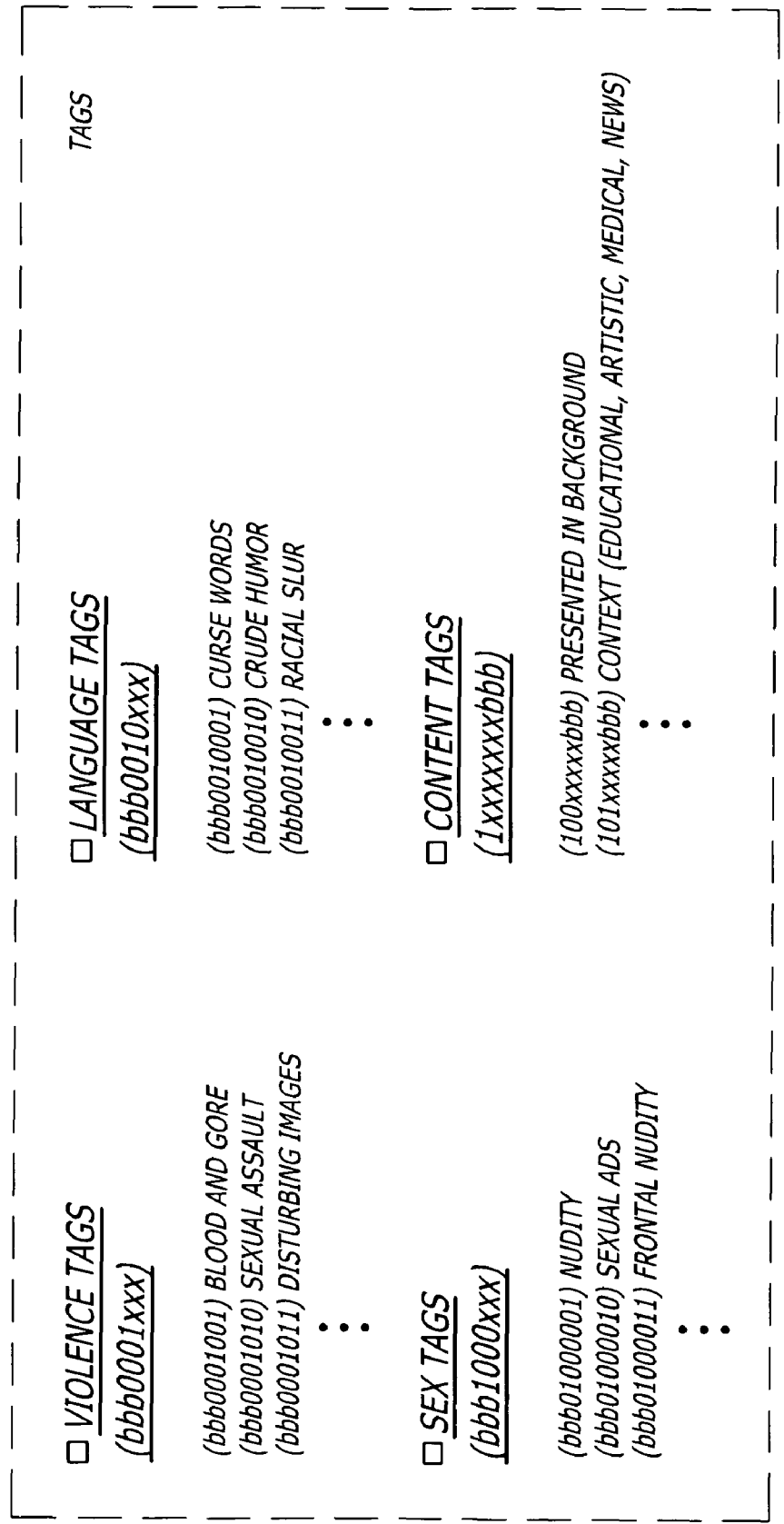

Referring back to FIG. 6, another determination is whether the display of the scene is controlled based on a tag rating scheme (blocks 640 and 645). As shown in FIGS. 9 and 10, the "tag rating" scheme provides a substantial granularity as to what specific content may be excluded. According to one embodiment, each category 900-940 and sub-category category is uniquely assigned a unique bit pattern so that a 4-byte tag value associated with each scene may be used to identify multiple categories where potential objectionable content may be found. Hence, specific renderings of violence, language, sex, etc. may be prevented.

As an optional configuration, each category may be assigned a particular bit and sub-categories are identified by bit combinations inclusive of the bit assigned to the category. As an example, as shown in FIG. 10, a tag table may be created where a fourth least significant bit (bbb00001xxx) of a double word tag (4-bytes, where "b" denotes byte) is set when the scene involves violence. For the violence categories, a number of subcategories may be used to denote blood and gore (bbb00001001); sexual assault (bbb00001010), disturbing images (bbb00001011), etc.

Hence, for each scene, the tag is extracted from the closed captioning information and processed, such as conducting Exclusive OR'ed with the parent control parameter tags set by the user, in order to determine if any objectionable content is found in the scene. If not, the original content may be displayed. Otherwise, the content is blocked.

Figure 11:
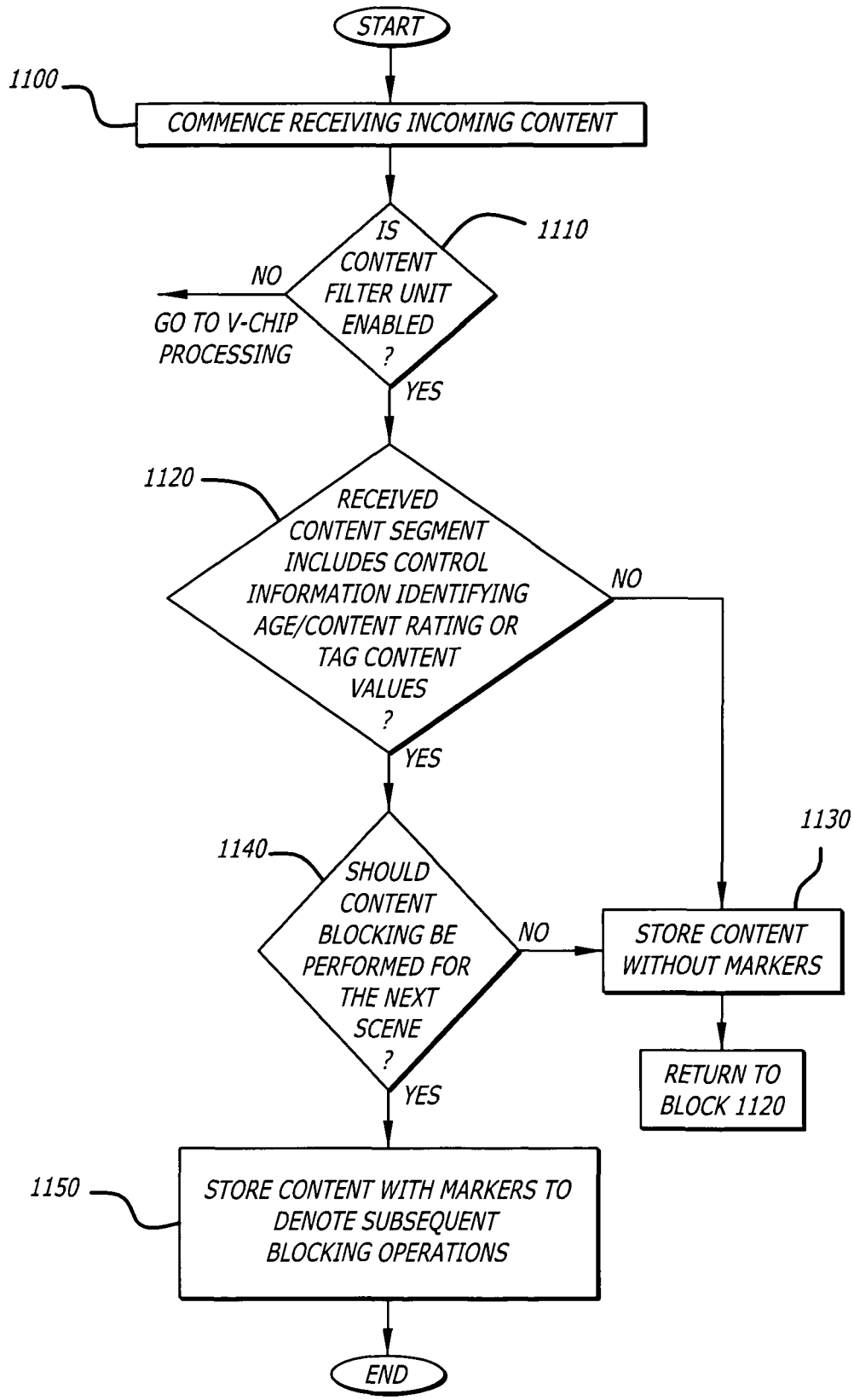
FIG. 11 is an exemplary diagram for post-recording scenes of content consistent with certain embodiments of the invention.

Referring now to FIG. 11, an exemplary diagram of a post-recording content replacement process consistent with certain embodiments of the invention is described. As shown, upon receipt of content into a digital device (e.g., PVR) and determination that the content filtering functionality of the PVR has been enabled, for each scene, a portion of the incoming content segment is accessed to retrieve information concerning the scene (block 1100). As an illustrative example, data within User Picture Data field of a MPEG packet may be accessed.

A determination is made whether the evaluated content segment includes closed captioning information to enable filtering of the content (block 1110). If not, the received content segment is rendered without filtering. In the event that the received content segment includes closed captioning information for filtering, a determination is made whether the received content includes closed captioning information that features rating and/or tags (block 1120). If not, the content should be stored without markers (block 1130).

If so, a determination is made whether the content should be blocked (block 1140). This determination may be accomplished by either determining whether the Age or Content ratings for the scene exceed parental control limits or confirming that content identified in the tag values are not precluded.

If blocking is required, one or more markers are placed within the data stream during storage of the content. These marker(s) are used to identify, during subsequent rendering of the content after storage, which scenes are to be blocked (block 1150).

In the foregoing description, the invention is described with reference to specific exemplary embodiments thereof. It will, however, be evident that various modifications and changes may be made thereto without departing from the broader spirit and scope of the present invention as set forth in the appended claims. The specification and drawings are accordingly to be regarded in an illustrative rather than in a restrictive sense.

What is claimed is:

1. A method for implementing parental control on a scene-by-scene basis on a digital device comprising:
   receiving incoming digital content from a digital data stream intended as a scene of a program;
   decoding the scene during playback, decoding the scene of the program includes determining on a scene-by-scene basis if the scene of the program includes objectionable content based on closed captioning information included with the content; and
   blocking a display of the scene of the program if, during the decoding, the scene of the program is determined to include objectionable content based on analysis of the closed captioning information,
   wherein the analysis of the closed captioning information includes obtaining hints that the scene of the program includes objectionable content, the hints being descriptions of noises suggesting sexual or violent situations in the scene of the program,
   wherein the analysis of the closed captioning information includes comparing the closed captioning information with prior established parental control limits, the prior established parental control limits including at least one of an Age-based parental control limit and a parental control parameter tag,
   wherein comparing the closed captioning information includes
   determining whether the closed captioning information includes an Age-based rating assigned to the scene of the program,
   in response to the closed captioning information including the Age-based rating assigned to the scene of the program, determining whether the Age-based rating assigned to the scene of the program exceeds the Age-based parental control limit,
   in response to the closed captioning information not including the Age-based rating assigned to the scene of the program, determining whether the closed captioning information includes a tag information assigned to the scene of the program, the tag information identifying at least one of a plurality of categories of objectionable content present in the scene of the program and at least one of a plurality of sub-categories of objectionable content present in the scene of the program, and
   in response to the closed captioning information including the tag information assigned to the scene of the program, determining whether the tag information assigned to the scene of the program corresponds to the parental control parameter tag.

2. The method of claim 1, wherein the scene of the program is fifteen frames of video for display.

3. The method of claim 1, wherein the scene of the program includes at least one frame of video for display.

4. The method of claim 1, wherein the blocking of the display of the scene includes blocking at least a portion of the scene from being displayed if the Age-based rating of the scene associated with the content exceeds the Age-based parental control limit.

5. The method of claim 1,
   wherein the blocking a display of the scene of the program includes blocking at least a portion of the content from being displayed if the tag information assigned to the scene of the program corresponds to the parental control parameter tag.

6. The method of claim 1, wherein prior to blocking the display of the scene of the program, the method further comprises storing markers to denote at least portions of the content to be blocked during playback from a storage device adapted to store the incoming content, the markers being placed within the data stream during storage of the incoming content.

7. The method of claim 1, wherein the content is a commercial of the program to be televised.

8. The method of claim 1, wherein the scene of the program is one frame of video for display.

9. The method of claim 1, wherein the closed captioning information is used to provide hints that an upcoming scene includes objectionable content.

10. The method of claim 9, wherein the hints are descriptions of noises or spoken dialogue suggesting sexual or violent situations in the upcoming scene.

11. The method of claim 1, wherein
    the plurality of categories of objectionable content includes violence, offensive language, and sexual content, and
    the plurality of sub-categories associated with the violence category of objectionable content includes blood, gore, sexual assault, and disturbing images.

12. A digital device comprising:
    a tuner/demodulation unit adapted to receive incoming digital content from a digital data stream including a scene of a program; and
    a data processing unit coupled to the tuner/demodulation unit, the data processing unit to (i) decode the scene of the program during playback, decoding the scene includes determining on a scene-by-scene basis if the scene of the program includes objectionable content that exceeds a preset rating, and (ii) block the scene of the program from being displayed if, during the decoding at (i), the content is determined to include objectionable content that exceeds the preset rating, wherein the data processing unit determines if the scene of the program includes objectionable content by analyzing closed captioning information included with the incoming content to obtain hints that the scene of the program includes objectionable content, the hints being descriptions of noises suggesting sexual or violent situations in the scene of the program,
    wherein analyzing of the closed captioning information includes comparing the closed captioning information with the preset rating, the preset rating including at least one of an Age-based parental control limit and a parental control parameter tag,
    wherein comparing the closed captioning information includes
    determining whether the closed captioning information includes an Age-based rating assigned to the scene of the program,
    in response to the closed captioning information including the Age-based rating assigned to the scene of the program, determining whether the Age-based rating assigned to the scene of the program exceeds the Age-based parental control limit, in response to the closed captioning information not including the Age-based rating assigned to the scene of the program, determining whether the closed captioning information includes a tag information assigned to the scene of the program, the tag information identifying at least one of a plurality of categories of objectionable content present in the scene of the program and at least one of a plurality of sub-categories of objectionable content present in the scene of the program, and in response to the closed captioning information including the tag information assigned to the scene of the program, determining whether the tag information assigned to the scene of the program corresponds to the parental control parameter tag.

13. The digital device of claim 12, wherein the scene of the program ranges between one and thirty frames of video for display and the preset rating is a parental control limit preset to indicate what subject matter for the content is acceptable for a viewing audience.

14. The digital device of claim 12, wherein the data processing unit includes a processor and a decoder coupled to the processor, the decoder to determine if the scene of the program includes objectionable content.

15. The digital device of claim 12, wherein, when the Age-based rating assigned to the scene of the program exceeds the Age-based parental control limit, the data processing unit to block the scene from being displayed.

16. The digital device of claim 12, wherein the data processing unit blocking the scene from being displayed if the tag information associated with the content corresponds to the parent control parameter tag to indicate that the content includes objectionable content.

17. The digital device of claim 12, wherein the data processing unit is adapted to store markers within the content that identify a location of the objectionable content within the content, the markers to denote at least portions of the content to be blocked during playback from a storage device adapted to store the incoming content and in communication with the data processing unit, the markers being placed within the data stream during storage of the incoming content.

18. The digital device of claim 12, wherein the scene of the program is one frame of video for display.

19. The digital device of claim 12, wherein the closed captioning information is used to provide hints that an upcoming scene includes objectionable content.

20. The digital device of claim 19, wherein the hints are descriptions of noises or spoken dialogue suggesting sexual or violent situations in the upcoming scene.

21. The digital device of claim 12, wherein
the plurality of categories of objectionable content includes violence, offensive language, and sexual content, and
the plurality of sub-categories associated with the violence category of objectionable content includes blood, gore, sexual assault, and disturbing images.

22. A non-transitory machine readable medium to tangibly store thereon software that, if executed by logic, will cause a digital device to perform the following operations:
software code to decode a scene of a program during playback, decoding the scene of the program includes determining on a scene-by-scene basis if the scene of the program includes objectionable content, the scene of the program being a portion of a first stream of digital content received by the digital device from a digital data stream from an external source,
wherein determining if the scene of the program includes objectionable content includes analyzing closed captioning information included with the scene of the program to obtain hints that the scene of the program includes objectionable content, the hints being descriptions of noises or spoken dialogue suggesting sexual or violent situations in the scene of the program; and
wherein analyzing of the closed captioning information includes comparing the closed captioning information with a preset parental control limit, the preset parental control limit including at least one of an Age-based parental control limit and a parental control parameter tag,
wherein comparing the closed captioning information includes
determining whether the closed captioning information includes an Age-based rating assigned to the scene of the program,
in response to the closed captioning information including the Age-based rating assigned to the scene of the program, determining whether the Age-based rating assigned to the scene of the program exceeds the Age-based parental control limit,
in response to the closed captioning information not including the Age-based rating assigned to the scene of the program, determining whether the closed captioning information includes a tag information assigned to the scene of the program, the tag information identifying at least one of a plurality of categories of objectionable content present in the scene of the program and at least one of a plurality of sub-categories of objectionable content present in the scene of the program, and
in response to the closed captioning information including the tag information assigned to the scene of the program, determining whether the tag information assigned to the scene of the program corresponds to the parental control parameter tag; and
software code to block a portion of the scene of the program from being displayed if, during the decoding, the Age-based rating assigned to the scene of the program exceeds the Age-based parental control limit or if, during the decoding, the tag information assigned to the scene of the program corresponds to the parental control parameter tag.

23. The non-transitory machine readable medium of claim 22, wherein the scene of the program is one frame of video for display.

24. The non-transitory machine readable medium of claim 22, wherein the closed captioning information is used to provide hints that an upcoming scene includes objectionable content.

25. The non-transitory machine readable medium of claim 24, wherein the hints are descriptions of noises or spoken dialogue suggesting sexual or violent situations in the upcoming scene.

26. The non-transitory machine readable medium of claim 22,
wherein the plurality of categories of objectionable content includes violence, offensive language, and sexual content, and
the plurality of sub-categories associated with the violence category of objectionable content includes blood, gore, sexual assault, and disturbing images.

* * * * *